United States Patent
Heintzelman et al.

(10) Patent No.: US 11,269,232 B2
(45) Date of Patent: Mar. 8, 2022

(54) EC ELEMENT ARCHITECTURE FOR CONCEALMENT AND COATING DESIGNED TO HIDE CAMERAS AND COMPONENTS BEHIND A SUBSTRATE

(71) Applicant: Gentex Corporation, Zeeland, MI (US)

(72) Inventors: Adam R. Heintzelman, Grand Rapids, MI (US); George A. Neuman, Holland, MI (US); David J. Cammenga, Zeeland, MI (US); Mario F. Saenger Nayver, Zeeland, MI (US); Jian Gao, Holland, MI (US); Xiaoxu Niu, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 307 days.

(21) Appl. No.: 16/596,080

(22) Filed: Oct. 8, 2019

(65) Prior Publication Data

US 2020/0110322 A1 Apr. 9, 2020

Related U.S. Application Data

(60) Provisional application No. 62/742,560, filed on Oct. 8, 2018.

(51) Int. Cl.
| | |
|---|---|
| *G02F 1/15* | (2019.01) |
| *G02F 1/163* | (2006.01) |
| *G02F 1/1524* | (2019.01) |
| *G02B 1/115* | (2015.01) |
| *G02F 1/157* | (2006.01) |

(52) U.S. Cl.
CPC .............. *G02F 1/163* (2013.01); *G02B 1/115* (2013.01); *G02F 1/157* (2013.01); *G02F 1/1524* (2019.01); *G02F 2203/09* (2013.01); *G02F 2203/62* (2013.01)

(58) Field of Classification Search
CPC ........ G02F 1/163; G02F 1/1524; G02F 1/157; G02F 2203/09; G02F 2203/62; G02B 1/115
USPC .................................................. 359/265–275
See application file for complete search history.

(56) References Cited

U.S. PATENT DOCUMENTS

| | | |
|---|---|---|
| 4,902,108 A | 2/1990 | Byker |
| 5,278,693 A | 1/1994 | Theiste et al. |
| 5,790,298 A | 8/1998 | Tonar |
| 6,512,624 B2 | 1/2003 | Tonar et al. |
| 6,621,616 B1 | 9/2003 | Bauer et al. |
| 7,612,929 B2 | 11/2009 | Tonar et al. |
| 9,097,885 B2 | 8/2015 | Kothari |
| 2012/0229882 A1 | 9/2012 | Fish, Jr. et al. |
| 2017/0177935 A1 | 6/2017 | Weller et al. |
| 2017/0355313 A1 | 12/2017 | Park et al. |

*Primary Examiner* — William Choi
(74) *Attorney, Agent, or Firm* — Price Heneveld LLP; Brian James Brewer

(57) ABSTRACT

A switchable device is provided. The switchable device includes an electro-optic element switchable between a darkened state and a transmissive state in addition to a sensor having a field of view at least partially defined by a perimeter portion of the electro-optic element. The darkened state is configured to mask the sensor and visibly match the perimeter portion.

20 Claims, 11 Drawing Sheets

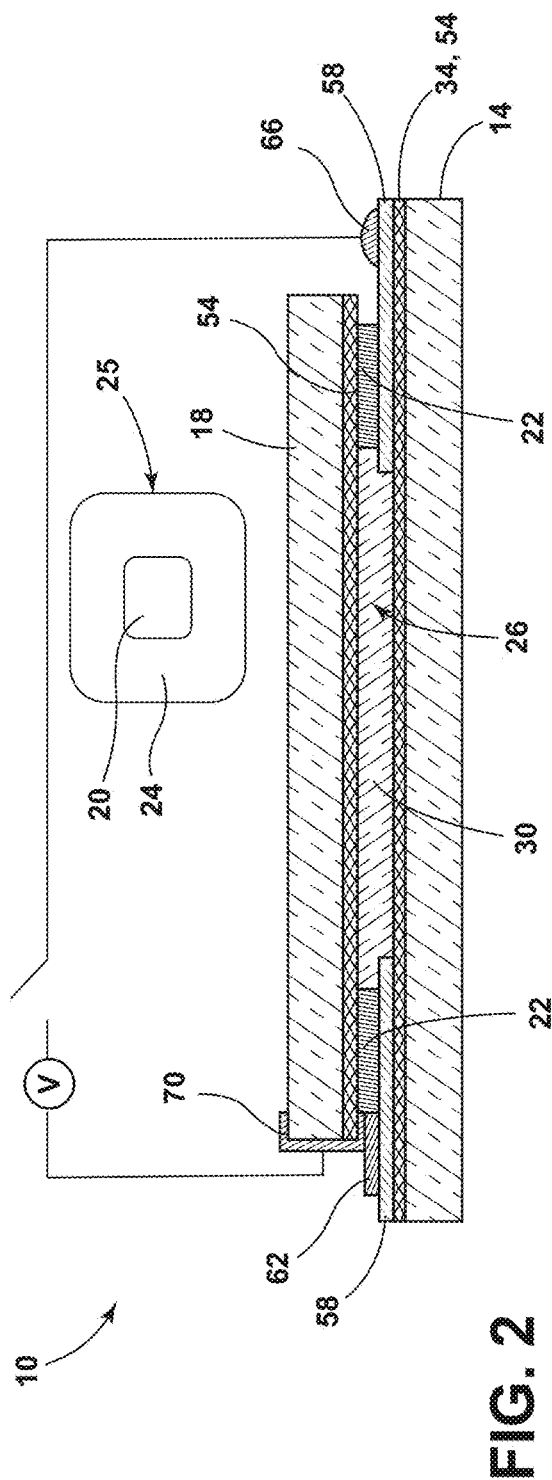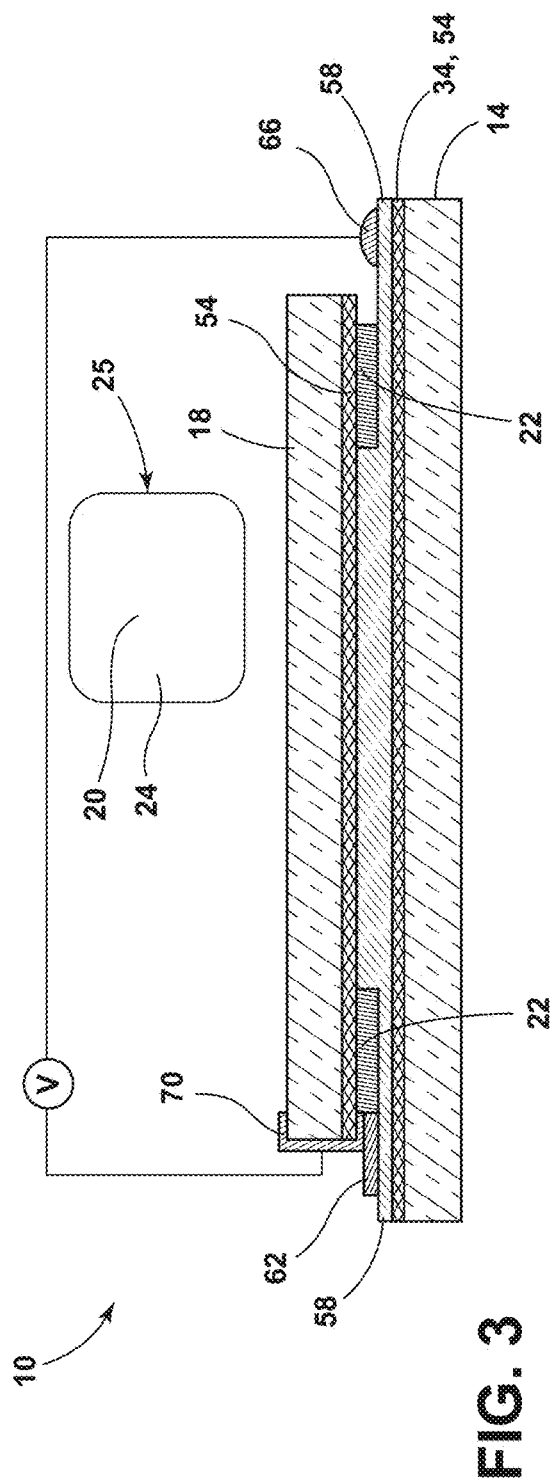

EC ELEMENT ARCHITECTURE FOR CONCEALMENT AND COATING DESIGNED TO HIDE CAMERAS AND COMPONENTS BEHIND A SUBSTRATE

CROSS-REFERENCE TO RELATED APPLICATION

This application claims priority to and the benefit under 35 U.S.C. § 119(e) of U.S. Provisional Application No. 62/742,560, filed on Oct. 8, 2018, entitled EC ELEMENT ARCHITECTURE FOR CONCEALMENT AND COATING DESIGNED TO HIDE CAMERAS AND COMPONENTS BEHIND A SUBSTRATE, the disclosure of which is hereby incorporated herein by reference in its entirety.

TECHNOLOGICAL FIELD

The present disclosure generally relates to several different architectures used to conceal components behind a substrate, and more particularly, to coatings designed to match electro-optic materials used in switchable devices.

BACKGROUND

As vehicles are equipped with additional electronics including sensors and cameras, there is an increasing demand and need to hide or camouflage these devices so that they are not obvious and are inconspicuous. The visibility of the camera, or other sensor system, is a product of the transmittance of the cover or barrier in front of the camera. While a low transmittance glass or plastic cover may hide the camera, this same low transmittance cover will likely inhibit the optimal function of the camera.

Accordingly, there exists a need to have a cover system where a sensor can be effectively hidden from view and provide good aesthetics while still enabling the sensor to properly function.

SUMMARY

According to some aspects of the present disclosure, a switchable device is provided. The switchable device includes an electro-optic element switchable between a darkened state and a transmissive state in addition to a sensor having a field of view at least partially defined by a perimeter portion of the electro-optic element. The darkened state is configured to mask the sensor and visibly match the perimeter portion.

According to other aspects of the present disclosure, an electro-optic element is provided. The electro-optic element includes a first substantially transparent substrate defining a first surface and a second surface; a second substantially transparent substrate defining a third surface and a fourth surface; a primary seal disposed between the first and second substrates, the seal and the first and second substrates defining a cavity therebetween; an electro-optic material positioned within the cavity; a color suppressed transparent conducting oxide layer positioned on the second surface; and an optical stack positioned on the color suppressed transparent conducting oxide layer.

According to other aspects of the present disclosure, an electro-optic element is provided. The electro-optic element includes a first substantially transparent substrate defining a first surface and a second surface. A second substantially transparent substrate defining a third surface and a fourth surface. A primary seal disposed between the first and second substrates, the seal and the first and second substrates defining a cavity therebetween. An electro-optic material positioned within the cavity. A transflective coating having a reflectance less than about 15% in a visible wavelength band positioned on the second surface, including a first layer comprising a transparent conductive oxide, a second layer comprising a first absorbing metal, a third layer comprising a transparent conductive oxide, and a fourth layer comprising a low absorbing metal. The transflective coating is in contact with the electro-optic material.

According to another aspect of the present disclosure, a transparency is provided. The transparency includes a first substantially transparent substrate defining a first surface and a second surface; a color suppressed transparent conducting oxide layer positioned on the second surface; and an optical stack positioned on the color suppressed transparent conducting oxide layer. The optical stack includes a first layer comprising a transparent conductive oxide; a second layer comprising a first absorbing metal; a third layer comprising a quarter wave transparent conductive oxide; and a fourth layer comprising a second absorbing metal. The optical stack is in contact with an electro-optic material and around the perimeter.

According to another aspect of the present disclosure, a transparency is provided. The transparency includes a substrate defining a first surface and a second surface. A transflective coating having a reflectance less than about 15% in a visible wavelength band positioned on at least one of the second and third surfaces, including a first layer comprising a first transparent conductive oxide, a second layer comprising a first absorbing metal, a third layer comprising a second transparent conductive oxide, and a fourth layer comprising a second absorbing metal. The transflective coating is in contact with the electro-optic material.

According to another aspect of the present disclosure, a transparency is provided. The transparency includes a substrate defining a first surface and a second surface. A transflective coating having a reflectance less than about 15% in a visible wavelength band positioned on the second surface, including an opaque, conductive coating on the transflective coating in the area of the perimeter. The transflective coating is in contact with the electro-optic material.

These and other aspects, objects, and features of the present invention will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 2 is a cross-sectional view of a de-energized electro-optic assembly according to some aspects of the present disclosure;

FIG. 3 is a cross-sectional view of an energized electro-optic assembly according to some aspects of the present disclosure;

DETAILED DESCRIPTION

Figure 1:
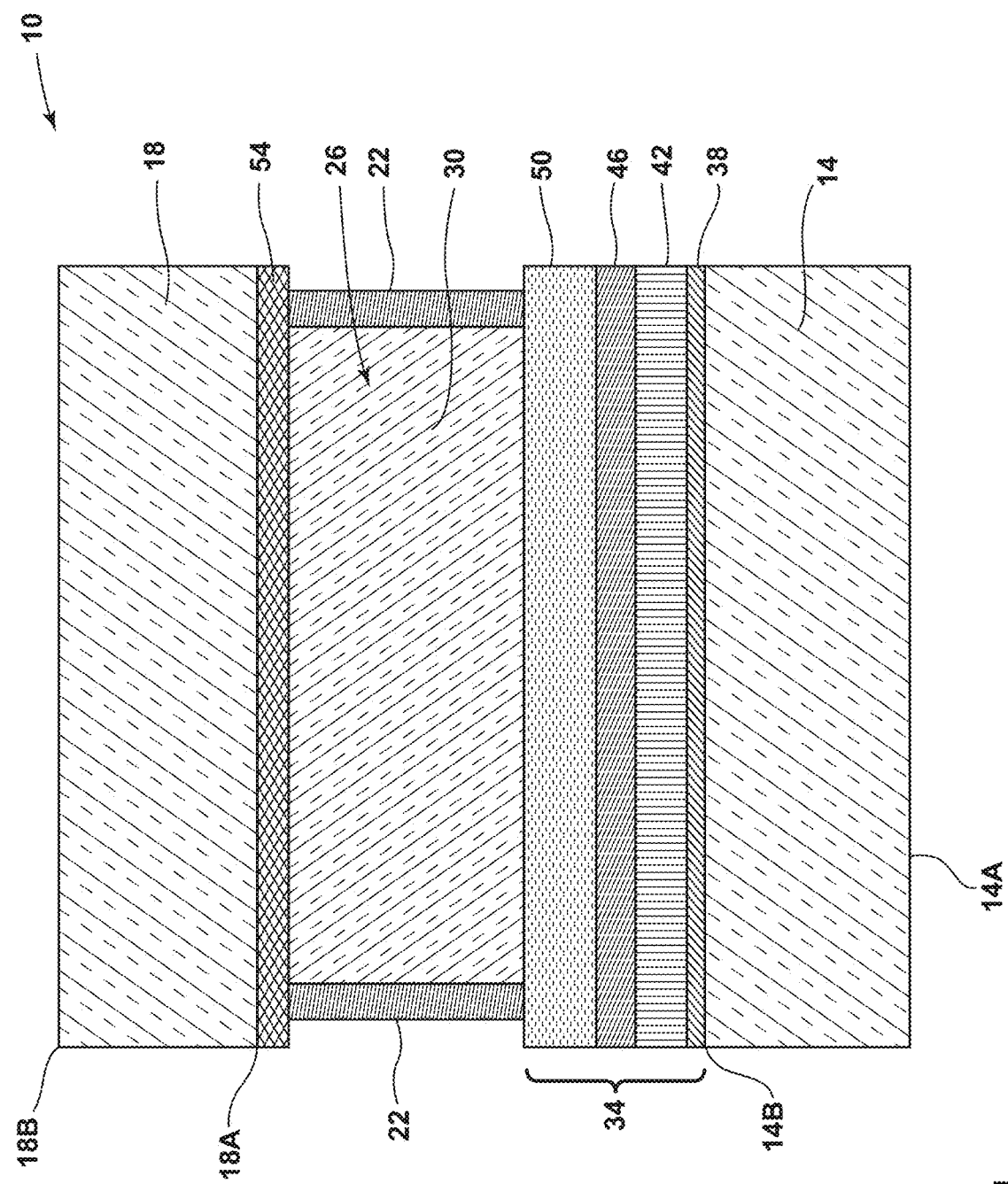
FIG. 1 is a cross-sectional view of an electro-optic assembly according to some aspects of the present disclosure.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Referring to FIGS. 1-9, several different aspects of a switchable device is provided. The reference numeral 10 generally designates an electro-optic element. The switchable device includes the electro-optic element 10 switchable between a darkened state and a transmissive state. The electro-optic element 10 additionally includes a sensor 25 having a field of view 20 at least partially defined by a perimeter portion 24 of the electro-optic element 10. The darkened state is configured to mask the sensor 25 and visibly match the perimeter portion 24.

As more automotive vehicles are equipped with cameras there is an increasing demand and need to hide or camouflage the cameras so that they are not obvious. Ideally, the camouflaging should blend seamlessly with the design of the rest of the vehicle and the camera would be completely hidden when not in use and only be enabled during use of the vehicle. The visibility of the camera, or other sensor system, is a product of the transmittance of what is in front of the camera. In some examples, the sensor may include a camera, a proximity sensor, a speed sensor, a light sensor, a weather sensor, a particle sensor, an animal sensor, or a combination thereof. For example, a low transmittance glass or plastic may hide the camera but the low transmittance in the camera active state may inhibit optimal function of the camera. Therefore, there exists a need to have a switchable system wherein the viewing area in front of the camera can be toggled from a high to a low transmittance state while simultaneously having good aesthetics.

The aesthetics for a switchable device introduces additional problems for the system. Common switchable devices rely on electricity to change the state of an electrochromic or liquid crystal states or the like. These systems require electrical buses, wires and the like to connect to the electrical bus components, and seals that need to be hidden in the high transmittance state. Thus, it may be advantageous to hide these components, match the design scheme of the vehicle and provide for durable seals and other characteristics. In the hidden, or dark state, the viewing area, or field of view, needs to match the hidden area, such as a perimeter portion, adequately to avoid drawing attention to the differences and have sufficiently reduced transmittance so that the camera is hidden and inconspicuous. In some examples, matching the viewing area and the hidden area may include visibly matching the field of view and the perimeter portion. A visible match may include low value contrast between the viewing area and the hidden area. As such, the viewing area and the hidden area may have a substantially similar transmittance, such that differences in transmittance may not be easily detectable. The viewing area must also conduct electricity and have electrical resistance values commensurate with those needed for the active material.

The aesthetics, such as color and/or reflectance, should be relatively stable over different viewing angles to blend well with the vehicle. The value of chroma, or the chromatic value, may be represented by C* units. In an L*C*h color space, C* is the distance from a lightness axis (L*) beginning at 0 in the center of a polar coordinate system and may represent an intensity, or purity, of color. The stability of C* with angle may be defined by the formula:

$$\Delta C^* = \sqrt{(a^*_0 - a^*_1)^2 + (b^*_0 - b^*_1)^2}$$

where $a^*_0$ and $b^*_0$ represent a first, or initial, angle of viewing and $a^*_1$ and $b^*_1$ represent a second angle. In some examples, the $\Delta C^*$ may be stable at angle such that $\Delta C^*$ is approximately constant between two zones, which may include the field of view and the perimeter portion, as the angle shifts. The exact stability of the color and reflectance will depend on a given application, but the shift of the color with angle should be less than about 10 C* units, or less than about 5 C* units or less than about 2.5 C* units when the viewing angle is shifted up to about 30°, or about 45°, or up to about 60°. The color difference between the hidden and viewing areas should be less than about 7.5 C* units, or less than about 5 C* units or less than about 2.5 C* units. Additionally, a perceived difference in color may be measured by a ΔE value. Delta E may be defined as a measure of change in visual perception of two given colors and incorporates L* as well as a* and b* where the a* axis represents the green-red component and the b* axis represents the blue-yellow component. The difference or distance between two colors may be defined by the formula:

$$\Delta E = \sqrt{(L^*_0 - L^*_1)^2 + (a^*_0 - a^*_1)^2 + (b^*_0 - b^*_1)^2}$$

A ΔE less than 1.0 may be not perceptible by human eyes, while a ΔE of approximately 3 may be detectable at a glance by a casual observer. As such, the ΔE between the viewing area, or the field of view, and the hidden area, or the perimeter portion, may be visibly matched such that the ΔE value is less than about 15 units, or less than 10 units, or less than 7.5 units, or less than 5 units. According to various examples, the color may also be important. For example, the color may be selected to match or be similar to the vehicle's color. In other embodiments, the color purity should be very low thereby giving the device a black or colorless appearance. In this case, the color value, or C*, should be less than about 5, less than about 2.5 or less than about 1 unit.

To achieve a thin device and possibly improve durability of the electro-optic element 10, the sputtered coatings disclosed herein are designed to address one or more of the following properties: 1) color-matched to the darkened electro-optic material 30; 2) conductive to act as one of the electrodes; 3) robust to durability testing; 4) can interact with the electro-optic material 30 without contaminating it; 5) interact with the seal 22 without reducing its sealing integrity; 6) hide the enclosed electrical connections; and 7) provide UV protection to the seal 22. Traditional inks and stickers used in the art to provide a perimeter area used for protection or to conceal electrical connections in the device, for example, pose issues of reducing the durability of the device, especially their seal's integrity. In some aspects, the disclosed transflective coating 34, optical stack 78, and/or black conductive coating 58 formed using sputtered techniques to fabricate the respective electro-optic elements 10 can achieve at least three, at least four, at least five, at least six, or at least seven of these preferred benefits. As used herein, the term sputtered coatings is not limited to a specific deposition technique such as Magnetron Sputter Vapor Deposition (MSVD) which is a common sputtering technique. The term may also apply to other PVD deposition techniques such as evaporation or chemical deposited materials such as CVD or PECVD. Generally, sputtered coatings are meant to encompass techniques which result in dense, durable thin film coatings.

In some aspects, the electro-optic element 10 may have challenges to attain an appearance match between a field of view zone 20 and a perimeter zone 24 of a sensor 25. The optical properties of thin film coatings will vary with changes in the refractive index of the incident and exit media. Therefore, the system, including the thin film stack, must be designed to take all aspects of the system into consideration in order to get a good match between the two zones. Special designs must be employed if the refractive index of the electro-optic media differs substantially from the seal material. In some embodiments, the impact of potential refractive index differences may be minimized by selecting designs where the electro-optic element 10 provides lower transmittance, such as using a transflective coating 34 and thereby achieving several of the preferred properties listed above.

Referring now to FIG. 1, the electro-optic element 10 includes a first substantially transparent substrate 14 defining a first surface 14A and a second surface 14B. A second substantially transparent substrate 18 defining a third surface 18A and a fourth surface 18B. A primary seal 22 disposed between the first and second substrates 14, 18, the seal 22 and the first and second substrates 14, 18 defining a cavity 26 therebetween. An electro-optic material 30 positioned within the cavity 26. A transflective coating 34 having a reflectance less than about 15% in a visible wavelength band positioned on the second surface 14B. The transflective coating 34 including a first layer 38, a second layer 42, a third layer 46, and a fourth layer 50. The first layer 38 includes a transparent conductive oxide, the second layer 42 comprising a first absorbing metal, the third layer 46 includes a transparent conductive oxide, and the fourth layer 50 includes a low absorbing metal. The transflective coating 34 is in contact with the electro-optic material 30. According to various examples, the first surface 14A may be facing outwards from the electro-optic element 10 and is the surface being viewed or observed by a person. In other words, the first surface 14A may be the viewing surface. The fourth surface 18B may be known as an interior surface, or the side facing the camera or other sensor system. The term, "transparency", as used herein, is defined to include a coated single substrate, an insulated glass unit, and/or the electro-optic element 10.

The first substrate 14 may include a variety of materials transparent in the visible region of the electromagnetic spectrum including soda-lime float glass, EAGLE® glass, alkaline earth boro-aluminosilicate glass, GORILLA® glass, alkali-aluminosilicate glass, chemically strengthened glass, insulated glass, tempered glass, sapphire, optical crystals, diamond, quartz, ceramics, polymers, plastics and/or combinations thereof. The second substrate 18 may include the same, or different, materials as the first substrate 14. The first and second substrates 14, 18 may have a thickness between about 0.1 mm to about 10 mm, or between about 0.5 mm and about 5.0 mm, or between about 0.6 mm to about 3.0 mm. In some examples, the thicknesses of the first and second substrates 14, 18 may differ from one another. The first and second substrates 14, 18 may take a variety of shapes including square, rectangular, circular, oblong, and combinations thereof. According to various examples, the first and/or second substrates 14, 18 may have a curvature across the length or width (i.e., a vertical or horizontal axis, or in an X- and Y-direction in a horizontal plane) of the electro-optical element 10.

The first and second substrates 14, 18 can be positioned in a parallel relationship and sealed around the perimeter using the primary seal 22 to define the cavity 26. It will be understood that the transflective coating 34 and/or an electrode 54 may be positioned between the seal 22 and the first and second substrates 14, 18 or may be positioned entirely within the seal 22 such that the seal 22 is in contact with the second and third surfaces 14B, 18A without departing from the teachings provided herein. The seal 22 extends around the second and third surfaces 14B, 18A to confine the electro-optic material 30 between the first and second substrates 14, 18. Additional information related to forming a seal between a first and second substrate can be found in U.S. Pat. No. 5,790,298, entitled "METHOD OF FORMING OPTICALLY TRANSPARENT SEAL AND SEAL FORMED BY SAID METHOD," which is hereby incorporated herein by reference in its entirety. The cavity 26 may have a spacing between the first and second substrates 14, 18 of less than or equal to about 1000 µm, 750 µm, 500 µm, 250 µm, 100 µm, 90 µm, 75 µm, 50 µm, 40 µm, 35 µm, or less than or equal to about 20 µm.

The electro-optic element 10 illustrated in FIG. 1 has the electro-optic material 30 positioned between the first substrate 14 and the second substrate 18 in the cavity 26. According to one example, the electro-optic element may be a liquid crystal device, including a liquid crystal medium (e.g., the electro-optic material 30), configured to attenuate light transmitted through the electro-optic element 10. In another example, the electro-optic element 10 may be a suspended particle device. In some examples, the electro-optic material 30 may be an electrochromic material. In such examples, the electro-optic material 30 may be a solution phase as disclosed in U.S. Pat. No. 4,902,108 entitled "SINGLE-COMPARTMENT, SELF-ERASING, SOLUTION-PHASE ELECTROCHROMIC DEVICES, SOLUTIONS FOR USE THEREIN, AND USES THEREOF" and U.S. Pat. No. 5,278,693 entitled "TINTED SOLUTION-PHASE ELECTROCHROMIC MIRRORS," commonly assigned to Gentex Corporation, both of which are hereby incorporated in their entirety herein. In other examples, the electro-optic material 30 may be in a solid-state. In such a configuration, the electro-optic element discussed herein may be configured to be transitioned between substantially transparent and substantially darkened states. For example, the electro-optic material 30 may be configured to variably adjust the transmittance of visible light through the electro-optical element 10 from between about 0.1% to about 100%, from between about 0.1% to about 90%, from between about 0.1% to about 75%, from between about 0.1% to about 60%, from between about 10% to about 95%, from between about 50% to about 95%, or between about 20% to about 50%. In specific examples, the electro-optic material 30 may be configured to variably adjust the transmittance of visible light through the electro-optical element 10 from a maximum transmittance state to less than or equal to about 15%, about 10%, about 5%, about 2.5% or less than or equal to about 1%.

Referring now to FIGS. 2 and 3, the electrode 54 may be positioned on the second surface 14B and/or on the third surface 18A. The electrode 54 may include the transflective coating 34 and/or a transparent conductor such as a transparent conducting oxide (TCO) (e.g., indium-tin-oxide, F:SnO$_2$, doped-ZnO, IZO), carbon (graphene and/or graphite) and/or a conductive metal mesh (e.g., nanowires). Additionally or alternatively, the electrode 54 may include an IMI type structure where M includes a low index metal (e.g., silver and/or a silver alloy) and where I includes an insulator, dielectric and/or transparent conducting oxide. In cases where a TCO (e.g., indium-tin-oxide) is used, the electrode 54 may have a sheet resistance of between about 1 ohm/sq and about 100 ohms/sq. For example, the sheet resistance of the electrode 54 may be less than or equal to about 10 ohms/sq, about 6 ohms/sq or less than or equal to about 3 ohms/sq. Further, the transflective coating 34 may have sheet resistances less than or equal to about 10 ohms/sq, about 6 ohms/sq or less than or equal to about 3 ohms/sq. In the depicted examples, the electrode 54 is located on the opposite side of the cavity 26 from the transflective coating 34. It will be understood that the electrode 54 may be positioned on the same side of the cavity 26 as the transflective coating 34 and/or that the transflective coating 34 functions as an electrode without departing from the teachings provided herein. Further, the electro-optical element 10 may include multiple electrodes 54 (e.g., positioned on the second and third surfaces 14B, 18A) without departing from the teachings provided herein.

As explained with respect to FIG. 1, transflective coating 34 may include a first layer 38, the second layer 42, the third layer 46 and the fourth layer 50. The first and third layers 38, 46 may be composed of a dielectric material and/or transparent conducting oxide. In some aspects, the first layer 38 is a transparent conductive oxide. In other aspects, the third layer 46 is a transparent conductive oxide. The first and third layers 38, 46 may be further subdivided into sub-layers with the same or different refractive indices as one another. The dielectric material and/or transparent conducting oxide may be ITO, SnO$_2$, SiN, MgF$_2$, SiO$_2$, TiO$_2$, F:SnO$_2$, NbO$_x$, TaO$_x$, indium zinc oxide, aluminum zinc oxide, zinc oxide, electrically conductive TiO$_2$, CeO$_x$, ZnS, chromium oxide, ZrO$_x$, WO$_3$, nickel oxide, IrO$_2$, NiO$_x$, CrO$_x$, NbO$_x$, and/or ZrO$_x$, or other material with a refractive index between about 1.37 and about 4.0. The thickness of the first and third layers 38, 46 may vary over a wide range of thicknesses in order to simultaneously tune the reflected and transmitted properties. The first layer 38 may have a thickness of between about 20 nm to about 100 nm or 40 nm to greater than about 500 nm. The third layer 46 may have a thickness of between about 20 nm to about 100 nm or about 40 nm to greater than about 500 nm.

The second layer 42 may be composed of an absorbing material. In some aspects, the second layer 42 includes a first absorbing metal. The first absorbing material may be a metal, a metal oxide, a metal nitride and/or combinations thereof. Exemplary metals which may be utilized in the second layer 42 as the first absorbing metal may include chromium, molybdenum, nickel, inconel, indium, palladium, osmium, tungsten, rhenium, iridium, rhodium, ruthenium, stainless steel, tantalum, titanium, copper, nickel, gold, platinum, any other platinum group metals, zirconium, vanadium, AlSi alloys, alloys thereof and combinations thereof. The absorbing material of the second layer 42 may have a refractive index of between about 1.0 and about 6.0, or between about 2.0 and about 5.0, or between about 2.2 and about 4.8. An imaginary refractive index for the absorbing material may be less than or equal to about 3 times or less than or equal to about 2 times the real portion of the refractive index. A thickness of the second layer 42 may be between about 0.5 nm and 10 nm, or between about 1 nm and 6 nm.

The fourth layer 50 may be composed of a low absorption metal and/or a low refractive index metal. In some aspects, the fourth layer 50 includes a second absorbing metal. A low refractive index metal may be a metal with an index of refraction of less than or equal to about 2.0. Exemplary low absorption/refractive index metals may include silver, a silver alloy, gold, a gold alloy, copper, a copper alloy, aluminum, aluminum alloys, and/or combinations thereof. In some aspects, the low refractive index material may be doped. Exemplary dopants may include gold, palladium, platinum, rhodium, titanium, aluminum, zinc, copper, tin, silicon, germanium, manganese, magnesium, tungsten, lead, boron, chromium, thorium, tantalum, lithium, indium other dopants and/or combinations thereof. These dopants may be used to alter the optical properties of the host low refractive index material (e.g., silver), improve durability in environmental testing or improve the electrochemical stability of the low refractive index material. The fourth layer 50 may have a real refractive index of less than or equal to about 2.0, 1.5, 1.0 or less than or equal to about 0.5. The fourth layer 50 may have a thickness of between about 5 nm to about 25 nm or between about 9 nm to about 20 nm.

In some aspects, the fourth layer 50 may include aluminum alloys since they are particularly suitable in part their improved environmental durability. The basic stack remains consistent with glass/color tuning layer (first layer 38)/absorbing first metal (second layer 42)/approximate quarterwave layer (third layer 46)/transflective second absorbing metal (fourth layer 50) with the transflective or second absorbing metal employed being the environmentally durable metal with a low real refractive index. As previously described, aluminum has a high reflectance and, for that reason, is also of interest for fabrication of the third layer. Though the use of this material in peripheral rings is known, no improvements to its chemical and environmental durability have been proposed. Disclosed is a variety of alloys of aluminum and dopants that improve the stability of aluminum in EC-element environment. Elements such as magnesium, manganese, silicon, copper, ruthenium, titanium, copper, iron, oxygen, nitrogen or palladium either alone or in combination with other elements in this group will improve the stability of the aluminum. Other elements may be present in the aluminum without deviating from the spirit of this disclosure. The amounts of these elements required for improvement of aluminum qualities may be between 50 and 0.1 weight %, between 40 and 0.5 weight %, between about 25 and 0.5 weight %, and between about 10 and 0.5 weight %. The aluminum alloys and additional materials used and disclosed in U.S. Pat. No. 9,056,584 entitled "REARVIEW ASSEMBLY FOR A VEHICLE" assigned to Gentex Corporation, is hereby incorporated by reference in its entirety herein.

According to various examples, the transflective coating 34 may be modified such that sub-layer 42 isn't present and the low absorbing, low refractive index layer is positioned between layers 38 and 46 thus creating a so-called IMI structure. The IMI stack may be designed to have low color purity in the field of view 20. Additionally, properly designed additional layers may be present in the perimeter area to provide opacity and good color match to the field of view area 20.

In some aspects, the application and use of a black conductive coating 58 or conductive masking layer to provide an opaque layer to both conceal and protect the seal 22 from UV damage may be applied. Depending on the application and desired final properties of the electro-optic element 10, the sheet resistance of the black conductive coating 58 may be varied to be less than or equal to about 1 ohm/sq, less than or equal to about 5 ohms/sq, less than or equal to about 10 ohms/sq, less than or equal to about 15 ohms/sq, or less than or equal to about 20 ohms/sq. In other embodiments in which a less conductive layer is needed the sheet resistance may be between about 50 and 5000 ohm/sq, between about 100 and 1000 ohms/sq, between about 150 and 500 ohm/sq. In some aspects, the black conductive coating 58 may be positioned between the first substrate 14 and the transflective coating 34, and/or electrode 54 (see FIGS. 2-4). In other aspects, the black conductive coating 58 may be positioned between the transflective coating 34 and/or electrode 54 and the electro-optic material 30 (see FIG. 5). In certain embodiments where the black conductive coating 58 is below the transflective coating 34, the sheet resistance requirement may not be pertinent to the function of the device and the sheet resistance requirements may be omitted.

Referring to FIGS. 2 and 3, one example of the electro-optic element 10 includes the first substantially transparent substrate 14 positioned parallel to the second substantially transparent substrate 18. The primary seal 22 is disposed between the first and second substrates 14, 18 where the seal 22 coupled to the first and second substrates 14, 18 define the cavity 26 having the electro-optic material 30 positioned. The transflective coating 34 is positioned on the second surface 14B of the first substrate 14. As illustrated in FIG. 2, the electro-optic element 10 is in the clear/transmissive state when de-energized where the camera field of view (FOV) 20 may or may not be visible. To achieve high transmission while the camera is in use, the FOV 20 may have a high contrast from the surrounding area. As illustrated in FIG. 3, when the electro-optic element 10 is energized, the electro-optic element 10 has a lower transmission, which may include when the camera is not in use or when the underlying camera or electronic device is to be concealed. When in the darkened or energized state, the electro-optic element 10 may be designed so that the surrounding transflective coating 34 and the electro-optic material 30 match to an acceptable degree such that the FOV 20 and the surrounding area, including the perimeter 24, match and the camera FOV 20 is considered concealed. In this way, the electro-optic material 30 may include a transmission in the darkened state of less than or equal to about 15%, about 10%, about 5%, about 2.5% or less than or equal to about 1% to visibly match the perimeter portion 24. The contact features used to power the electro-optic element 10 may include the black conductive coating 58 positioned on the transflective coating 34 and/or electrode 54 with an isolation layer 62 isolating a backplane contact 66. The isolation layer 62 may be used to prevent any shorting to the conductive mask layer. A front plane contact 70 may be positioned to be in contact with the black conductive layer 58 alternatively positioned on the electro-optic device 10. The front plane contact 70 can be positioned anywhere on the mask coating as long as it is in contact with the transflective coating 34 and/or electrode 54 that is in contact with the electro-optic material 30.

Figure 4:
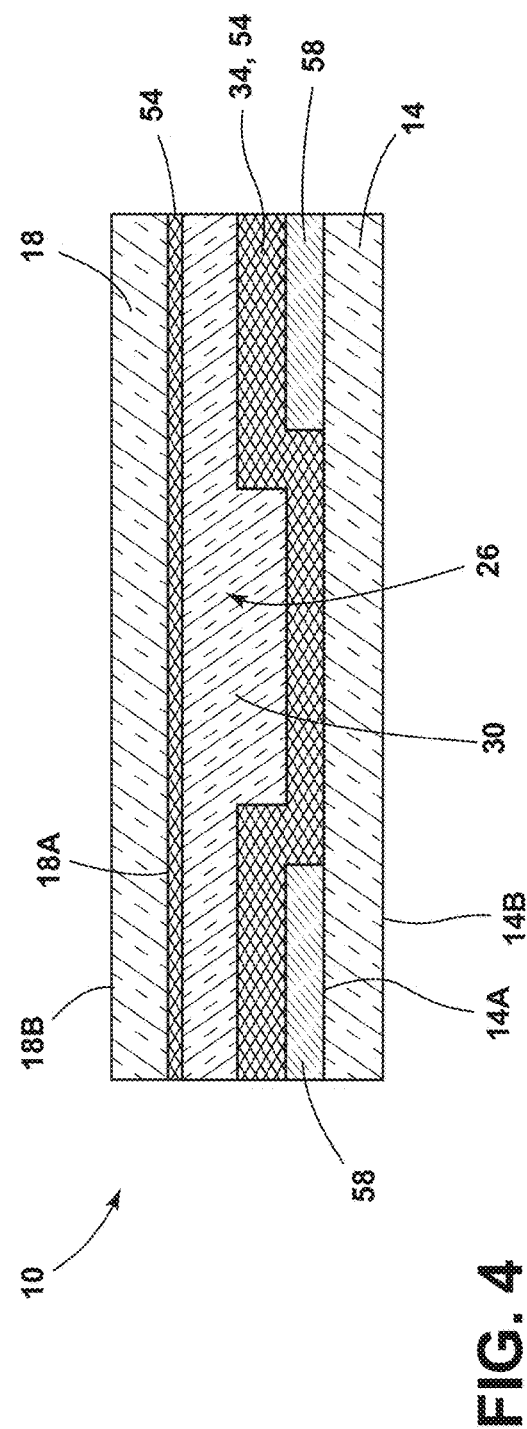
FIG. 4 is a cross-sectional view of a camera concealment coating used as a perimeter portion on an electro-optic assembly according to some aspects of the present disclosure.

Referring now to FIG. 4, another exemplary electro-optic element 10 is illustrated, which also includes the first substantially transparent substrate 14 positioned parallel to the second substantially transparent substrate 18. In this example, two portions of black conductive coating 58 are directly positioned on the second surface 14B of the first substantially transparent substrate 14. It is understood that, in this and other embodiments described herein, the black conductive coating 58 is not limited to two regions but may cover a portion or the entirety of the perimeter 24 of the part. The portions of black conductive coating 58 are then coated and layered between the transflective coating 34 and/or electrode 54 layer (e.g., TCO, ITO, etc.). The primary seal 22 is disposed between the transflective coating 34/electrode 54 layer and second substrates 18 where the coupled seal 22 defines the cavity 26 having the electro-optic material 30 positioned. In some aspects, the black conductive coating 58 may have four layers including: 1) a first sputtered amorphous silicon layer; 2) a sputtered silicon dioxide ($SiO_2$); 3) a second sputtered amorphous silicon layer; and 4) a sputtered molybdenum layer. The first sputtered amorphous silicon layer is positioned between the first substantially transparent substrate 14 and the second sputtered silicon dioxide ($SiO_2$) layer. The sputtered molybdenum layer is positioned between the second sputtered amorphous silicon layer and the transflective coating 34 and/or electrode 54 layer. Alternatively, the transflective coating 34 may be modified by substituting an absorbing layer for the low absorption, low index fourth layer 50. The other layers remain the same. In this way the transflective coating 34 is transformed into a low reflectance, opaque layer.

Figure 5:
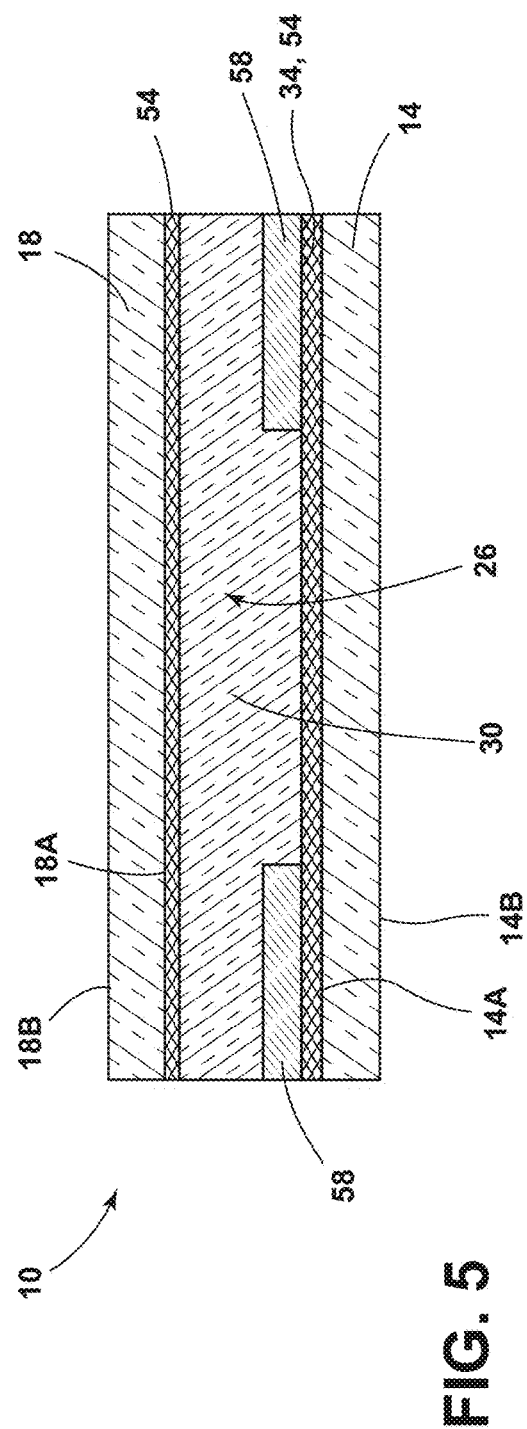
FIG. 5 is a cross-sectional view of a camera concealment coating used as a perimeter portion on an electro-optic assembly according to some aspects of the present disclosure.

Referring now to FIG. 5, another exemplary electro-optic element 10 is illustrated, which also includes the first substantially transparent substrate 14 positioned parallel to the second substantially transparent substrate 18. In this example, two portions of black conductive coating 58 are directly positioned on the transflective coating 34 and/or electrode 54 layer where the transflective coating 34/electrode 54 layer is positioned directly on the second surface 14B of the first substantially transparent substrate 14. The primary seal 22 is disposed between the portions of black conductive coating 58 and the second substrate 18 where the coupled seal 22 defines the cavity 26 having the electro-optic material 30 positioned. As described in FIG. 4, the black conductive coating 58 may have four layers including: 1) the first sputtered amorphous silicon layer; 2) the sputtered silicon dioxide ($SiO_2$); 3) the second sputtered amorphous silicon layer; and 4) the sputtered molybdenum layer. The first sputtered amorphous silicon layer is positioned between the transflective coating 34/electrode 54 layer and the second sputtered silicon dioxide ($SiO_2$) layer. The sputtered molybdenum layer is positioned between the second sputtered amorphous silicon layer and the electro-optic material 30 and seal. Alternatively, the transflective coating 34 may be modified by substituting an absorbing layer for the low absorption, low index fourth layer 50 and be positioned between the transflective coating 34/electrode 54 layer and the electro-optic material and seal.

Figure 6:
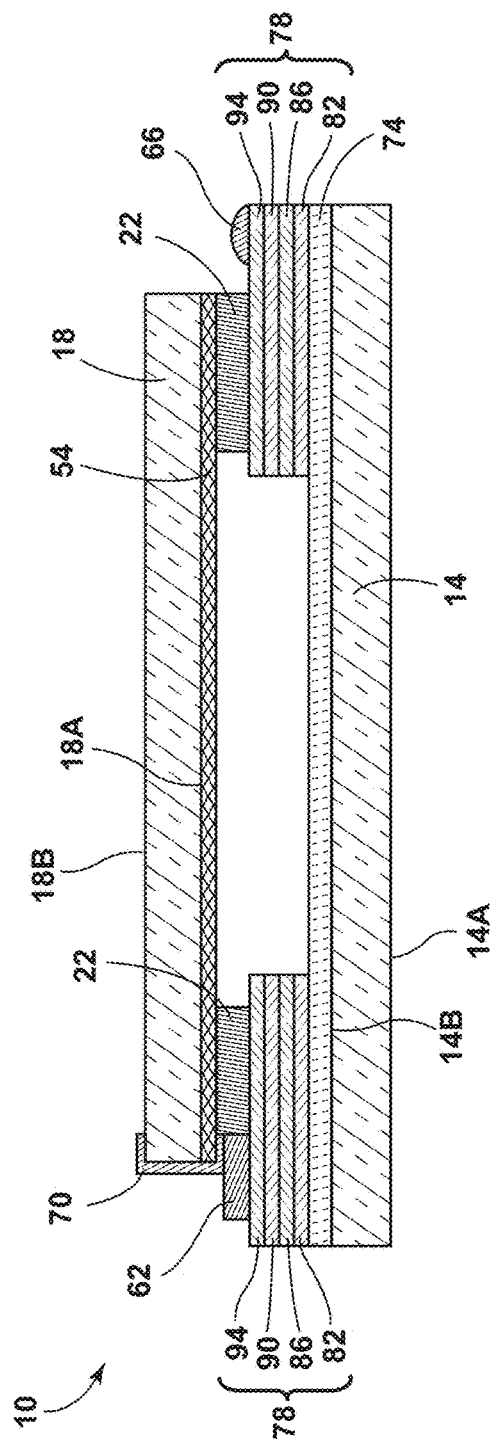
FIG. 6 is a cross-sectional view of a 4-layer optical stack coating used as a perimeter portion on an electro-optic assembly according to some aspects of the present disclosure.
Figure 7:
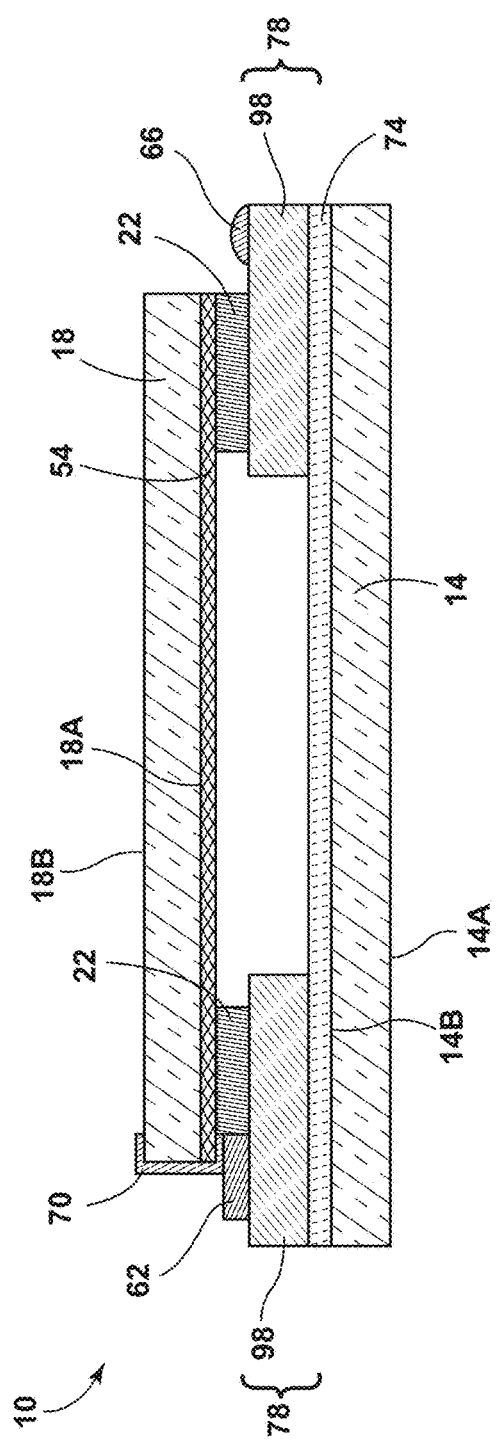
FIG. 7 is a cross-sectional view of a single-layer optical stack coating used as a perimeter portion on an electro-optic assembly according to some aspects of the present disclosure.

Referring to FIGS. 6 and 7, in some aspects, the electro-optic element 10 may be designed to have a high transmittance where an index matching layer, such as a color suppressed TCO layer 74, can be applied to the first substantially transparent substrate 14 to be used as the electrode 54. As defined herein, the color suppressed TCO layer 74 includes layering where the color suppression layer or layers may be sandwiched between the TCO layer and the first substantially transparent substrate 14.

Referring now to FIG. 6, yet another exemplary electro-optic element 10 is illustrated, which includes the first substantially transparent substrate 14 positioned parallel to the second substantially transparent substrate 18. The color suppressed TCO layer 74 is positioned on the second surface 14B of the first substantially transparent substrate 14. Two portions of an optical stack 78 are directly positioned on the color suppressed TCO layer 74. The primary seal 22 is disposed between the optical stack 78 and the electrode 54 positioned on the third surface 18A of the second substrate 18 where the coupled seal 22 defines the cavity 26 having the electro-optic material 30 positioned. In some aspects, the optical stack 78 has four sequentially positioned layers starting from the layer closest the first substrate 14 including: 1) a first layer 82 having a transparent conductive oxide; 2) a second layer 86 having a first absorbing metal; 3) a third layer 90 having a quarter wave transparent conductive oxide; and 4) a fourth layer 94 having a second absorbing metal. As disclosed above for the black conductive coating 58, the optical stack 78 may be positioned between either the color suppressed TCO layer 74 and the second surface 14B of the first substrate 14 or between the color suppressed TCO layer 74 and the seal 22/electro-optic material 30.

Referring now to FIG. 7, another exemplary electro-optic element 10 is illustrated, which includes the first substantially transparent substrate 14 positioned parallel to the second substantially transparent substrate 18. The color suppressed TCO layer 74 is positioned on the second surface 14B of the first substantially transparent substrate 14. In this example, two portions of an optical stack 78 including a chromium oxynitride ($CrO_xN_y$) layer 98 are layered directly on the color suppressed TCO layer 74 where the x and y variables are constants used to balance the net charge of the material to be zero. However, it is within the scope of the disclosure for the layer 98 to include any suitable oxynitride, oxide, or nitride having a dark, or black, appearance. The primary seal 22 is disposed between the chromium oxynitride ($CrO_xN_y$) layers 98 and the electrode 54 positioned on the third surface 18A of the second substrate 18 where the coupled seal 22 defines the cavity 26 having the electro-optic material 30 positioned. As disclosed above for the black conductive coating 58, the chromium oxynitride ($CrO_xN_y$) layers 98 may be positioned between either the color suppressed TCO layer 74 and the first substrate 14 or between the color suppressed TCO layer 74 and the seal 22/electro-optic material 30. In some aspects, the chromium oxynitride ($CrO_xN_y$) single layer 98 used as the optical stack 78 may help deal with interferential effects associated with the refractive index differences found in the electro-optic element 10.

Depending on the final application or design of the switchable device, the optical stack 78 may be designed to have a variety of different appearances including, for example, color, and reflectance. In some aspects, the first and/or second absorbing metals used in the second and fourth layers of the optical stack 78 may include silver, a silver alloy, gold, a gold alloy, copper, a copper alloy, aluminum, aluminum alloys, magnesium, manganese, silicon, copper, ruthenium, titanium, copper, iron, palladium, and/or combinations thereof. In some aspects, the first and/or second absorbing metals may be doped using, for example, gold, palladium, platinum, rhodium, titanium, aluminum, zinc, copper, tin, silicon, germanium, manganese, magnesium, tungsten, lead, boron, chromium, thorium, tantalum, lithium, indium other dopants and/or combinations thereof. In some aspects, the optical stack 78 and/or electro-optic material 30 may each be individually tuned to provide a red, orange, yellow, green, blue, indigo, violet, or any other color available in the visible spectrum.

Figure 8:
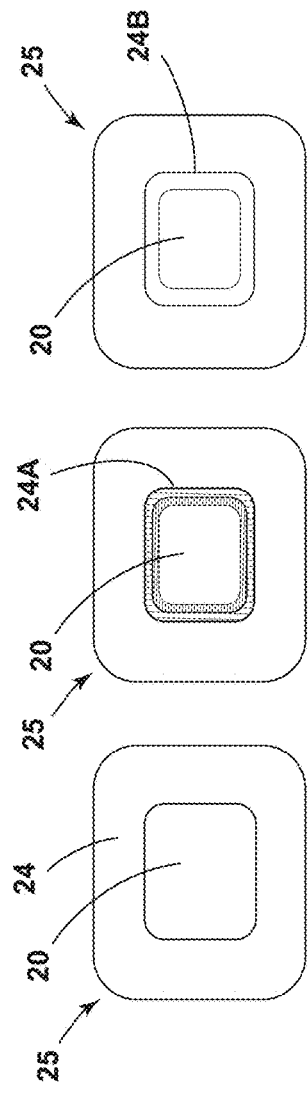
FIG. 8 are examples of a camera field of view according to some aspects of the present disclosure.

Referring now to FIG. 8, examples of the sensor 25, such as a camera, field of view 20 according to some aspects of the present disclosure are illustrated. In some aspects, if an exact color and reflectance match are challenging to achieve, the edges of the camera FOV 20 may be softened to reduce the sharp transition appearance of the camera FOV 20. Two examples are provided: the center image shows a dotted perimeter 24A and the right image shows a continuously gradient perimeter 24B. These softened edges as compared to the image on the far left reduce the contrast of the surrounding coating and the camera FOV 20 while the device is in the darkened or energized state.

Figure 9A:
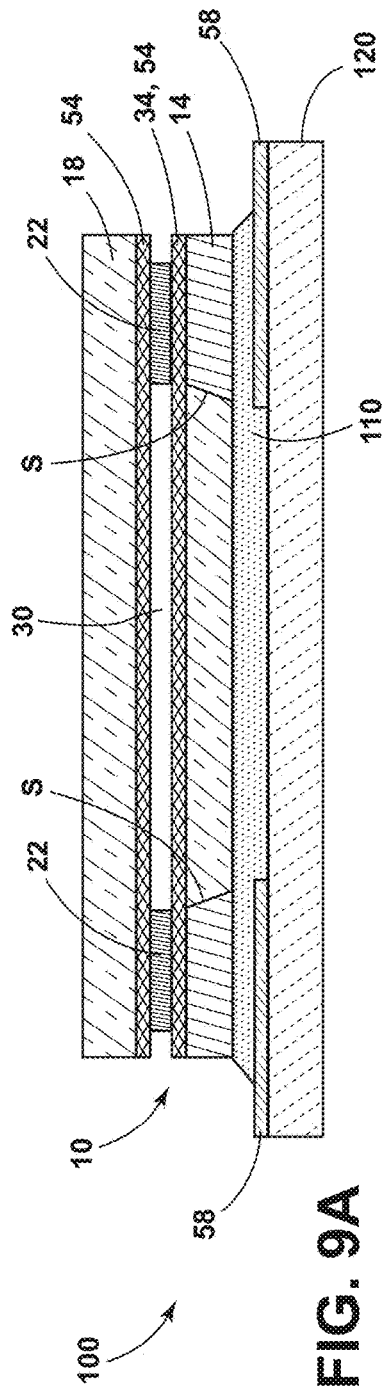
FIG. 9A is a cross-sectional view of an electro-optic device having a shadow area.
Figure 9B:
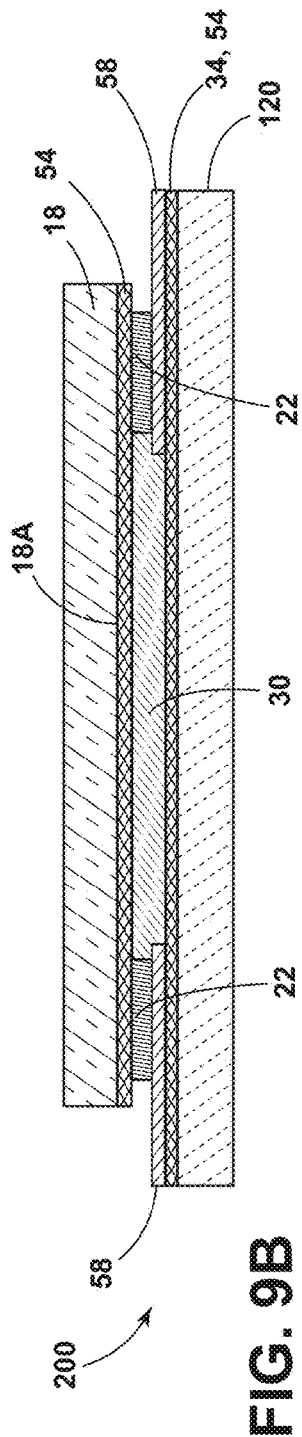
FIG. 9B is a cross-sectional view of an electro-optic device having a reduced thickness and a reduced shadow area according to some aspects of the present disclosure.

Referring now to FIGS. 9A and 9B, cross-sectional views of an electro-optic device 100 having a shadow area and an electro-optic device 200 having a reduced thickness and a reduced shadow area, each including a cover glass 120 according to some aspects of the present disclosure are illustrated. As illustrated, the location of the plane of the electro-optic material 30 relative to the surrounding black conductive coating 58 or mask coating can affect the contrast. It will be understood that in the electro-optic device 100 of FIG. 9A the coating 58 may not be conductive without departing from the teachings provided herein. In FIG. 9A, if the electro-optic element 10 is behind the plane of the black conductive coating 58, then ambient light can generate a shadow, S, on the subsequent layers of the device 100. As the plane of the electro-optic material 30 is brought closer to the plane of the surrounding black conductive coating 58, the width of the shadow, S, due to light parallax will also become narrower. This can be achieved in several ways, one of which is to reduce the thickness of the first substrate 14. Additionally one could also reduce the thickness of the optical bonding material 110. Further yet, one could remove the first substrate 14 and have the electro-optic material 30 be in direct contact with the third surface 18A of the second substrate 18, as shown in FIG. 9B. In FIG. 9B, the electro-optic material 30 is planar to the black conductive coating 58 and no shadow is generated around the camera FOV 20. Additionally, the second substrate 18 may be offset from the cover glass 120. In some examples, offset from may include the second substrate 18 having less width than the cover glass 120, which may be considered the first substrate 14 as illustrated in FIG. 9B. Alternatively, offset may include the second substrate 18 non-aligned with the cover glass 120, or first substrate 14. It may be advantageous to generate no shadow, however, in examples in which it is not feasible to place the electro-optic material 30 on the second surface 14B of the first substrate 14, the stackup between the electro-optic material 30 and the plane of the FOV 20 mask layer should be thin enough to allow the shadow width when the device is lit from angles of 60 degrees or more to be less than 40 microns at a viewing distance of 30 cm.

In some aspects, to help make the thickness of the electro-optic element 10 as thin as possible, e.g., for packaging reasons, it may be ideal to use thin substrates and as few substrates as possible. As provided in the images in FIG. 9A and FIG. 9B, by removing the first plane of glass 14 from the electro-optic device 100, the entire thickness can be reduced by that thickness, typically in the range of 0.5 mm to 1.6 mm, which allows the camera to be moved closer to FOV 20 opening which in turn generates a larger FOV 20 of the camera image when used. Regarding the FOV 20, in examples where the location of the camera is fixed, the opening in the mask, or black conductive coating 58, will need to grow larger as the distance between the camera and mask 58 is increased. Decreasing any of the substrates will decrease the required size of the opening of the mask 58.

Figure 9C:
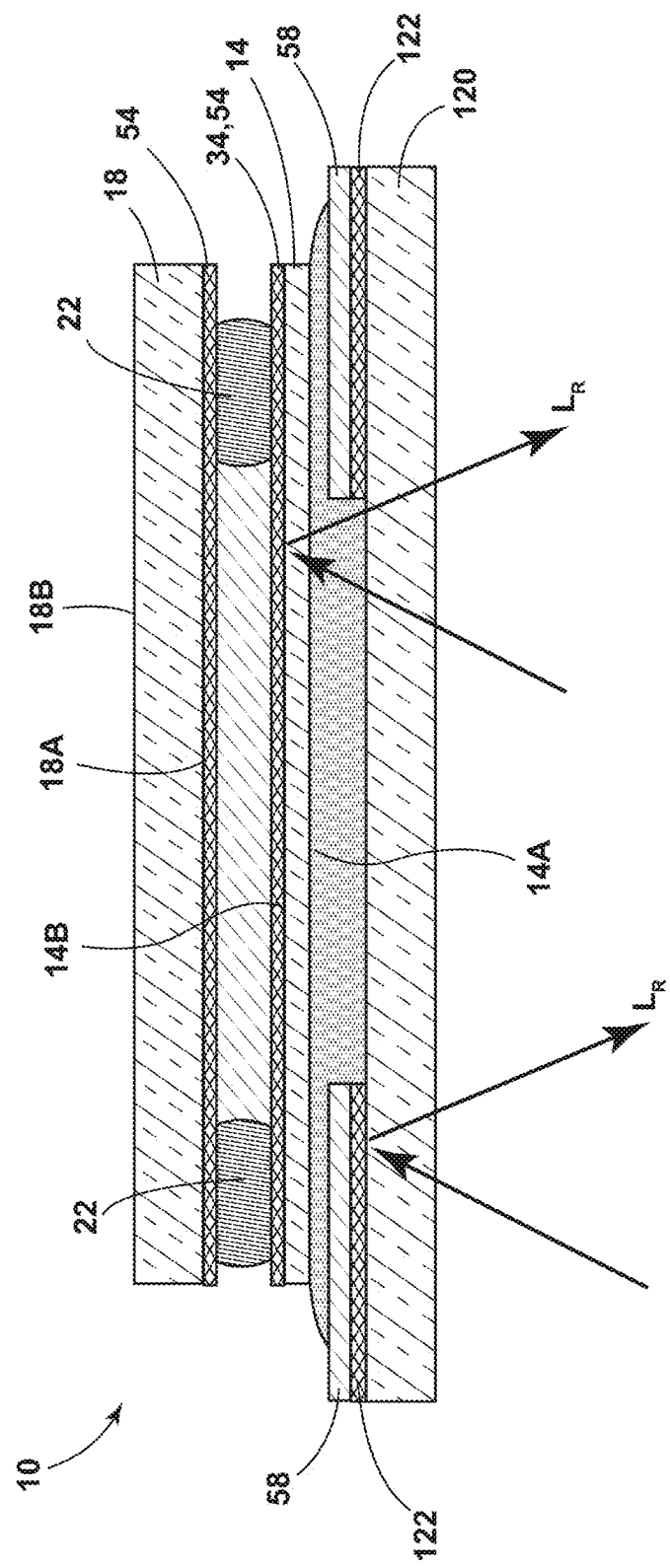
FIG. 9C is a cross-sectional view of an electro-optic device with a cover glass, according to at least one example.

Referring now to FIG. 9C, depicted is another example of the electro-optic element 10 showing the benefit of having a similar reflection from a viewer rearward surface of a cover substrate 120 as from the second surface 14B of the electro-optic element 10. The cover substrate 120 may be coupled to the first substrate 14 with an optical adhesive 124. By utilizing a transparent conductive material such as a transparent conductive oxide (TCO) coating 122 on a rear side of the cover glass 120 which is color matched to the same or to a optically similar transparent conductive material or TCO as present on the second surface 14B, the reflected spectrums, $L_R$, from rear side of the cover glass 120 and the second surface 14B will match. Such a feature may be advantageous in decreasing a perceived discontinuity of reflected color by a viewer of the electro-optic element 10. According to a specific example, ITO is used as the TCO coating 122. The optical thickness of ITO on the back of the cover glass 120 and the back of the first surface 14A are similar. A black mask coating, or paint, is applied to TCO coating 122 on the cover glass 120 and then portions of both materials are removed to create a camera FOV 20. Since each of the black paint and the dimmable area are highly light absorbing, the resulting reflectance and color come primarily from the color reflected from the ITO surfaces. The black mask could include paint, ink, a light absorbing coating or other material.

Use of the presently disclosed transflective coating 34, black conductive coating 58, and/or optical stack 78 in the electro-optical element 10 offer a variety of advantages. For example, the transflective coating 34, black conductive coating 58, and/or optical stack 78 may offer a variety of beneficial optical properties. For example, a delta C* (as measured proximate the first and/or fourth surfaces 14A, 18B) may be less than or equal to about 15, 10, 6 or less or equal to about 4 for reflected interior or exterior viewing angle shift of less than or equal to about 60°, 45°, 40°, 30°, 20°, 10°, or less than or equal to about 6° where 0° is normal to the viewing surface (e.g., the first or fourth surfaces 14A, 18B). In a specific example, the transflective coating 34, black conductive coating 58, and/or optical stack 78 have a delta C* of less than or equal to about 6 with angle shift up to about 45 degrees. Further, the transflective coating 34, black conductive coating 58, and/or optical stack 78 may have a C* value for at least one of transmittance, interior reflectance (e.g., reflectance measured from the first surface 14A) and exterior reflectance (e.g., with reflectance measured from the fourth surface 18B) of less than or equal to about 15, 10 or less than or equal to about 5. The transflective coating 34, black conductive coating 58, and/or optical stack 78 may provide an interior absorption (e.g., with reflectance as measured proximate the fourth surface 18B) which is greater than or equal to about 1.25 times, 1.5 times, or greater than or equal to about 2 times an exterior absorption (e.g., as measured proximate the first surface 14A). Further, an interior visible-band reflectance (e.g., as measured proximate the fourth surface 18B) may be between about 15% and about 50% or between about 20% and about 40% while an exterior visible-band reflectance (e.g., as measured proximate the first surface 14A) is less than or equal to about 20%, 15% or less than or equal to about 10%. The transflective coating 34, black conductive coating 58, and/or optical stack 78 may have a visible wavelength transmittance of between about 5% and about 95%, between about 10% and about 80%, or between about 15% and about 60%. Even further, the color of the interior and/or exterior visible reflectance may be tuned to match a color scheme of an interior or exterior of the enclosure (e.g., the vehicle 40 and/or a building).

In some aspects, the transflective coating 34, black conductive coating 58, and/or optical stack 78 may be deposited using sputtering techniques known in the art over the entire surface of the first substrate 14 to provide low reflectance and low color which will appear black from a viewer's perspective. The transflective coating 34 may be designed to be transflective though it will have a somewhat reduced transmittance to provide a degree of camouflage or concealment.

EXAMPLES

In some aspects, the design goals for these electro-optic devices 10 may be reached using one or more of at least two paths. In path one, there may be two distinct stacks in the hidden and viewing areas. With this embodiment, there may be layers in common to enable good aesthetics at the interface between the two zones. The common layers may also enable uninterrupted flow of electricity between the two zones. In path two, as described with respect to FIGS. 9A and 9B, the camera or sensor 25 may be moved closer to the FOV 20 opening which in turn generates a larger FOV 20 for the camera/sensor 25 when used.

In one example, one can start with a neutral color suppressed ITO which is colorless in reflectance. Therefore, when the electro-optic material 30 is darkened it won't have a significant color. In some aspects, the stack is: Glass/20.3 nm ITO/32.32 SiO$_2$/143.7 nm ITO. In this example, color suppression is achieved due to the 20.3 nm ITO/32.32 SiO$_2$ layers. Such a stack would have about 6% reflectance if the electro-optic material 30 is completely dark. This stack would be deposited first and then masked in the electro-optic material 30 area so that the next layers would be on top of this stack outside the electro-optic material 30 area. In some aspects, the next layers could be: 63 nm ITO/5 nm Cr/56.4 nm of ITO/71 nm Cr. This stack would also be expected to have a reflectance of about 6% and comparable reflected color while being opaque.

Example 1

Figure 10:
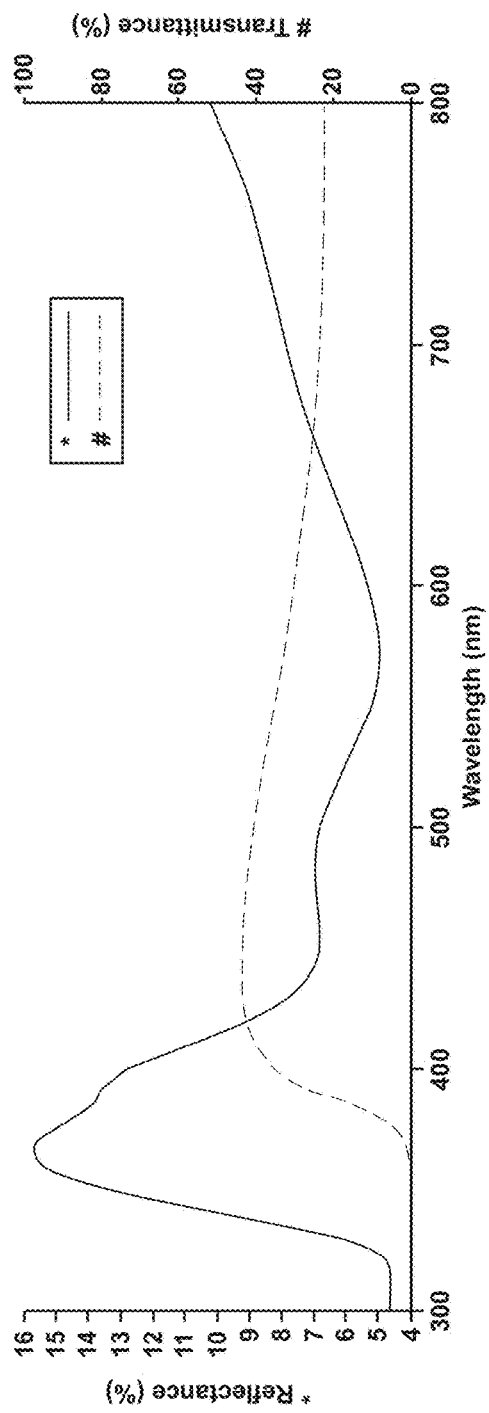
FIG. 10 is a plot depicting percent spectral reflectance and transmittance with respect to wavelength according to some aspects of the present disclosure.

In the first example, the following transflective coating 34 is applied to the second surface 14B. In this case, the color is low with a reflected C* that is 6.5 units and provided below in Tables 1 and 2. FIG. 10 provides the reflectance and transmittance values for this transflective coating 34.

TABLE 1

| Material | Thickness (nm) |
| --- | --- |
| Ag/Au (7% Au) | 8.18 |
| ITO | 42.41 |
| Ru | 2.79 |
| ITO | 172.7 |
| Glass | |

TABLE 2

| | Reflectance | Transmittance |
| --- | --- | --- |
| Y | 5.73 | 34.97 |
| L* | 28.72 | 65.72 |
| a* | 1.24 | −5.54 |
| b* | −6.41 | −9.85 |
| C* | 6.5 | |

Example 2

Figure 11:
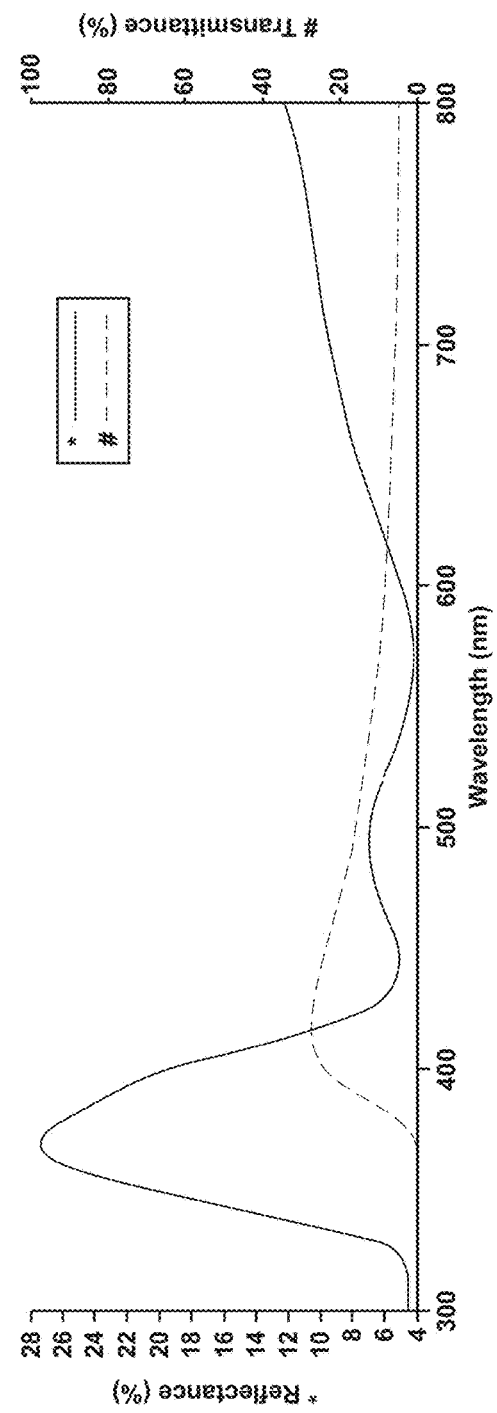
FIG. 11 is a plot depicting percent spectral reflectance and transmittance with respect to wavelength according to some aspects of the present disclosure.

In the next example, the transflective coating 34 is modified so that the transmittance in the bleached state is reduced. Example 1 used a single material along with the metals but alternate or multiple materials may be used and be within the scope of the disclosure. The layers, their thicknesses, and the corresponding reflectance and transmittance values are provided below in Tables 3 and 4. FIG. 11 provides the reflectance and transmittance values for this transflective coating 34.

TABLE 3

| Material | Thickness (nm) |
| --- | --- |
| Ag/Au (7% Au) | 19.97 |
| ITO | 51.2 |
| Ru | 4.02 |
| ITO | 177.57 |
| Glass | |

TABLE 4

| | Reflectance | Transmittance |
| --- | --- | --- |
| Y | 5.36 | 11.89 |
| L* | 27.74 | 41.04 |
| a* | 0.84 | −0.55 |
| b* | −4.17 | −23.42 |
| C* | 4.3 | |

Example 3

Figure 12:
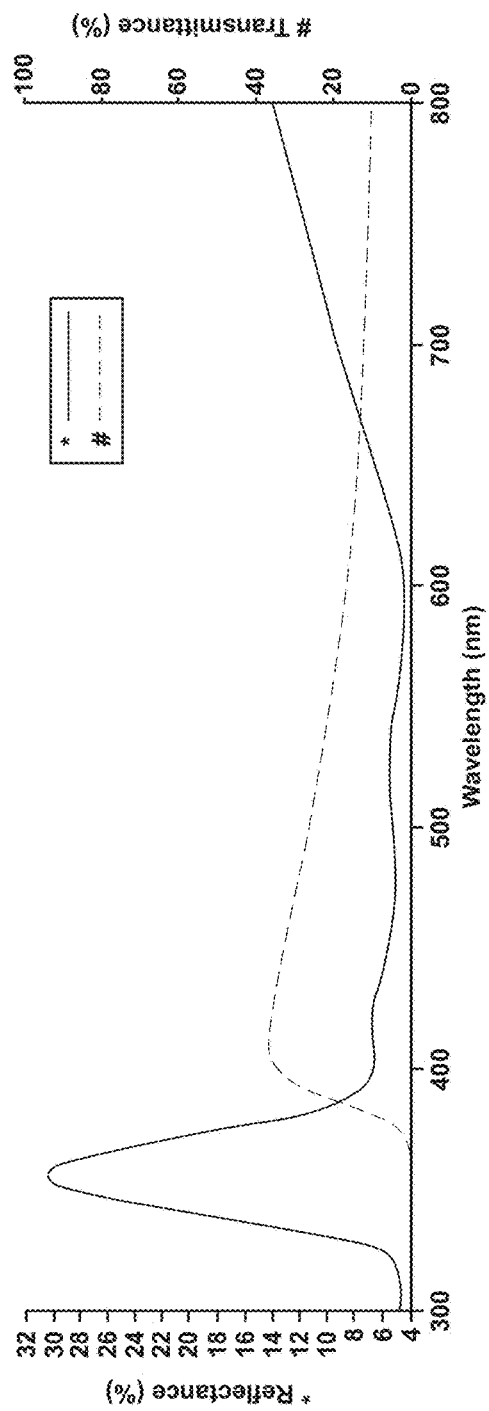
FIG. 12 is a plot depicting percent spectral reflectance and transmittance with respect to wavelength according to some aspects of the present disclosure.

The next example demonstrates a transflective coating 34 utilizing both ITO and TiO$_2$ as the TCO/dielectric layers. The transflective property of the transflective coating 34 is due to the inclusion of the silver containing layer. This material provides good transparency, electrical conductivity and good color. The second metal layer may be different than a silver containing layer and act as a relatively high absorption layer. The layers, their thicknesses, and the corresponding reflectance and transmittance values are provided below in Tables 5 and 6. FIG. 12 provides the reflectance and transmittance values for this transflective coating 34.

TABLE 5

| Material | Thickness (nm) |
| --- | --- |
| Ag/Au (7% Au) | 13.81 |
| TiO2 | 11.57 |
| ITO | 29.89 |
| Ru | 3.82 |
| ITO | 106.96 |
| TiO2 | 44.51 |
| ITO | 57.17 |
| Glass | |

TABLE 6

| | Reflectance | Transmittance |
| --- | --- | --- |
| Y | 5 | 21 |
| L* | 26.74 | 52.95 |
| a* | 0.6 | −3.33 |
| b* | −3.14 | −18.27 |
| C* | 3.2 | |

Example 4

Figure 13:
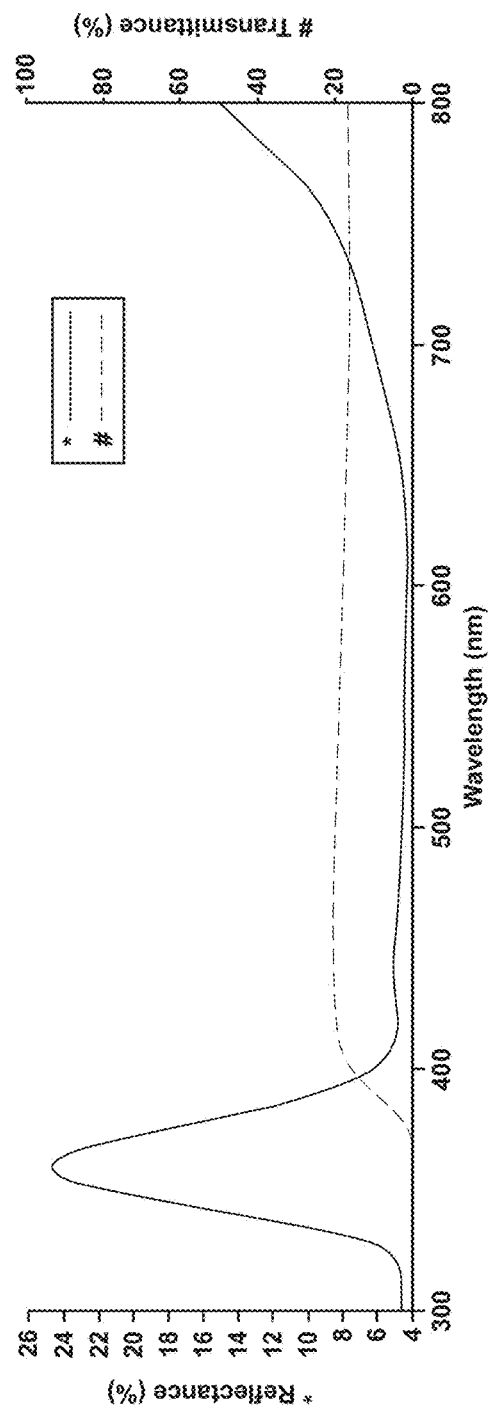
FIG. 13 is a plot depicting percent spectral reflectance and transmittance with respect to wavelength according to some aspects of the present disclosure.

In the next example, the thin ruthenium layer is exchanged for tungsten. The switch of metals demonstrates that the desired optical properties are not tied to a limited set of metals and other metals may be desirable. The introduction of tungsten as an alternate to ruthenium yields a low reflected C* and a low transmitted C*. The layers, their thicknesses, and the corresponding reflectance and transmittance values are provided below in Tables 7 and 8. FIG. 13 provides the reflectance and transmittance values for this transflective coating 34.

TABLE 7

| Material | Thickness (nm) |
| --- | --- |
| Ag/Au (7% Au) | 12.6 |
| ITO | 23.9 |
| W | 8.23 |
| ITO | 110.96 |

TABLE 7-continued

| Material | Thickness (nm) |
|---|---|
| TiO2 | 48.27 |
| ITO | 59.92 |
| Glass | |

TABLE 8

| | Reflectance | Transmittance |
|---|---|---|
| Y | 4.52 | 19.05 |
| L* | 25.32 | 50.75 |
| a* | 0.37 | −1.67 |
| b* | −2.48 | −2.38 |
| C* | 2.5 | 2.9 |

Example 5

Figure 14:
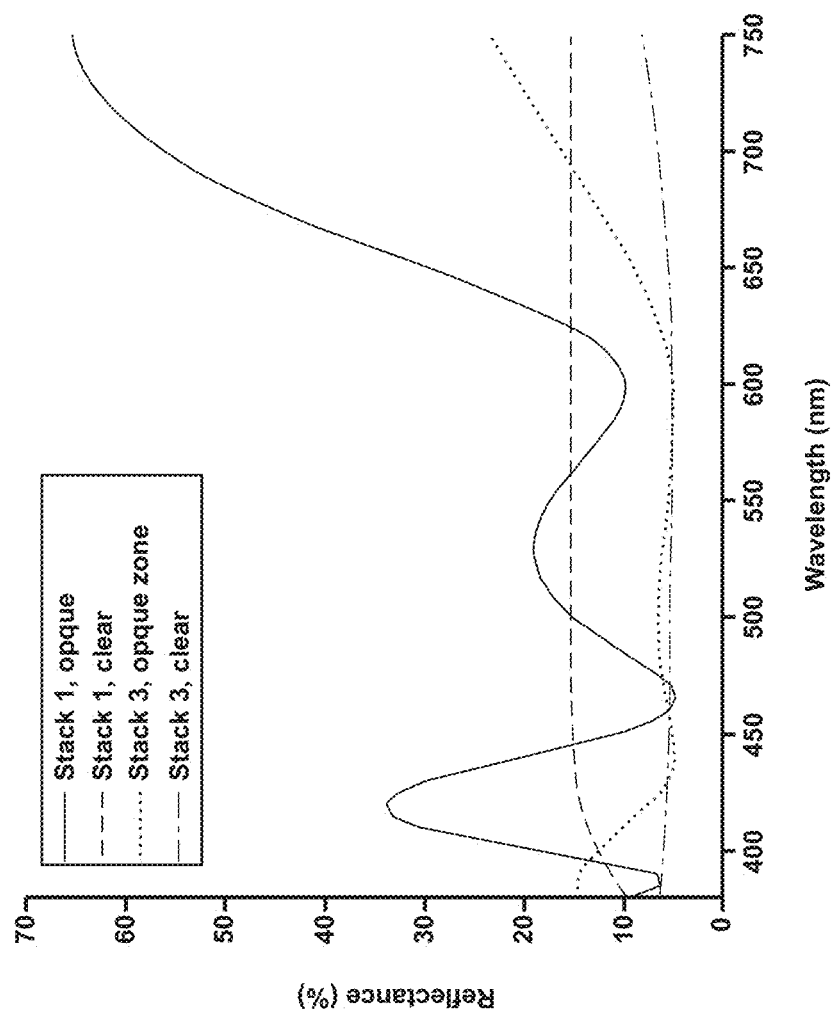
FIG. 14 is a plot depicting percent spectral reflectance with respect to wavelength according to some aspects of the present disclosure.

In another embodiment one can start with an Insulator/Metal/Insulator (IMI) antireflective electrode and add a stack with a low reflectance in the opaque areas. FIG. 14 depicts the reflectance spectra of different IMI/IMIM coatings. The IMI transparent electrode is deposited on surface 2 and an opaque coating with a matched reflected color and reflectance is added in the opaque zone. The thicknesses for each layer are shown in the columns denoted $I_i$ and $M_j$, where the subindex i denotes the layer number in the stack starting with 1 closes to the substrate. The material sequence for stacks 1, 2 and 3 corresponds to INTO, A: Silver-Gold alloy with 7% gold content, C: Chromium, S: SiO$_2$. Depending on the materials and thicknesses one can match the reflectance and color for both zones for different reflectance levels as shown in Table 9 and FIG. 14 with a reflectance difference between the opaque and electrochromic zone of less than 3% and a chroma mismatch of less than 1.5 for neutral reflected colors and reflectance values between 5% and 15%.

TABLE 10

| Front Layer No. | Glass 5-Layer Design | |
|---|---|---|
| 1 | aSi | 5.34 nm |
| 2 | SiO2 | 42.98 nm |
| 3 | aSi | 29.03 nm |
| 4 | Mo | 103.59 nm |
| 5 | ITO | 130.00 nm |
| Back | EC fluid | |

TABLE 11

| | Visible Reflection at normal incidence | | |
|---|---|---|---|
| | Black coating | EC darkening | Sheet resistance |
| Y | 5.91 | 5.14 | 15 |
| a* | 5.52 | 7.77 | |
| b* | −3.99 | −5.18 | |

Example 7

Figure 16:
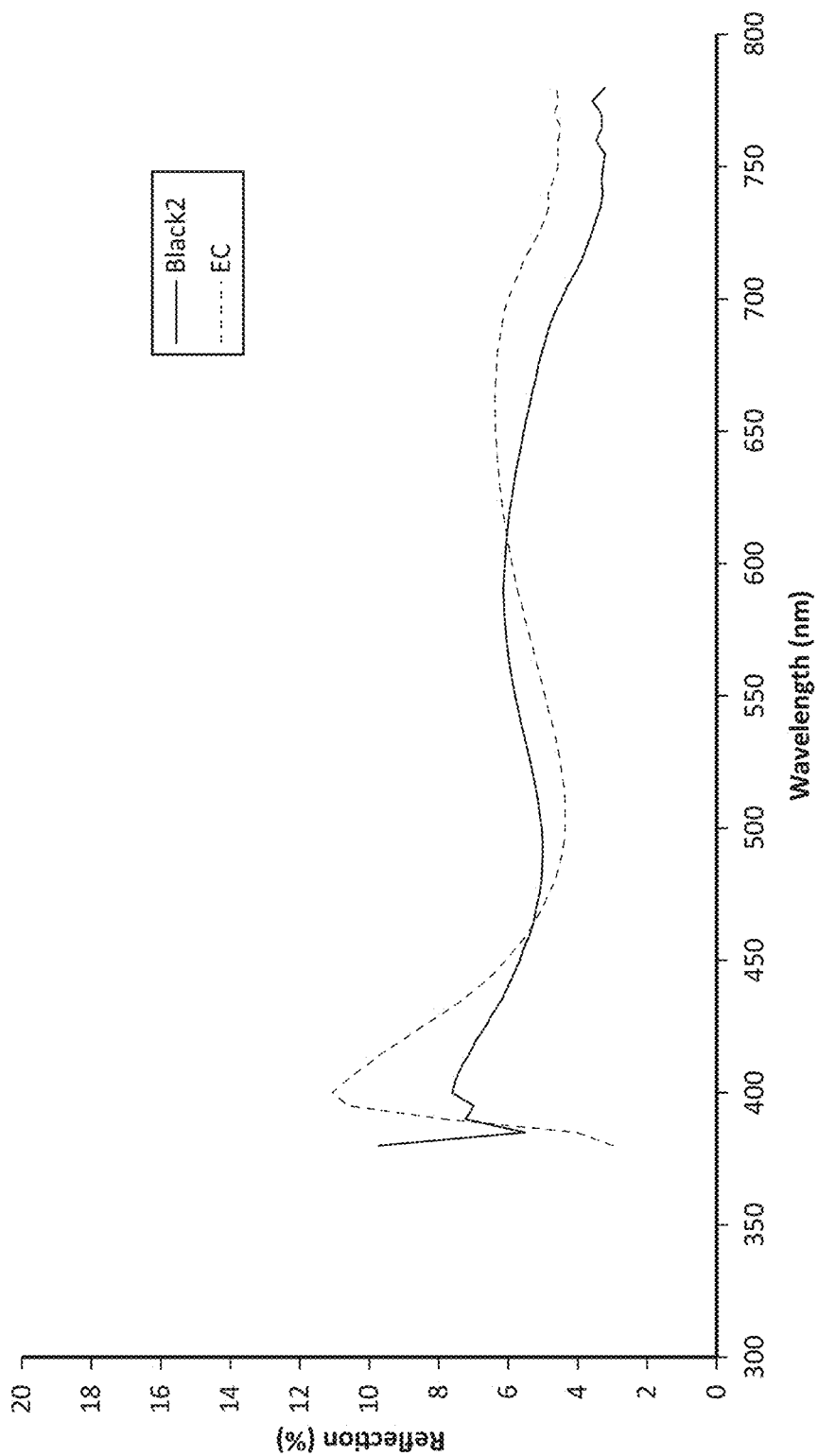
FIG. 16 is a plot depicting percent spectral reflectance with respect to wavelength according to some aspects of the present disclosure.

In the next example, an alternative camera concealment coating is set forth using a combination of silicon and molybdenum. The combination of silicon and molybdenum metals again demonstrates that the desired optical properties can be tuned to provide black or nearly opaque coating. The layers, their thicknesses, and the corresponding reflectance and transmittance values are provided below in Tables 12 and 13. FIG. 16 provides a plot depicting percent spectral reflectance with respect to wavelength for the black conductive coating 58 provided.

TABLE 9

| Material Stack seq. | IMI layers (nm) | | | IMIM layers (nm) | | | | IMI + IMIM (opaque zone) | | | | IMI (EC zone) | | | | | Zone mismatch | |
|---|---|---|---|---|---|---|---|---|---|---|---|---|---|---|---|---|---|---|
| | IMI1 | IMI2 | IMI3 | IMIM1 | IMIM2 | IMIM3 | IMIM4 | Yr | a* | b* | Yt | Yr | a* | b* | Yt | SR | ΔYr | ΔC* |
| 1 IAI-ICIC | 36.4 | 6.4 | 46.3 | 182.9 | 5.0 | 60.2 | 22.5 | 5.7 | 0.0 | 0.0 | 2.1 | 5.2 | 0.2 | −1.0 | 89.6 | 13.1 | 0.6 | 1.0 |
| 2 IAI-ICIC | 34.4 | 7.5 | 67.8 | 175.7 | 3.2 | 179.1 | 9.1 | 10.3 | 0.2 | 0.0 | 12.4 | 10.0 | 0.2 | 0.1 | 84.4 | 12.4 | 0.3 | 0.1 |
| 3 IAI-ICIC | 48.8 | 7.2 | 100.9 | 146.6 | 3.1 | 176.8 | 48.6 | 15.0 | 0.0 | 0.0 | 0.3 | 15.0 | 1.1 | 0.2 | 83.4 | 11.4 | 0.0 | 1.1 |
| 4 ICI-SCSC | 14.0 | 1.3 | 94.3 | 147.2 | 4.4 | 240.0 | 50.0 | 7.7 | 0.4 | −0.6 | 0.0 | 5.4 | 0.3 | −0.2 | 72.0 | 37.2 | 2.3 | 0.4 |
| 5 ICI-SCSC | 59.0 | 7.6 | 17.3 | 107.0 | 7.0 | 258.3 | 50.0 | 10.2 | 3.7 | −0.2 | 0.0 | 10.2 | 3.7 | −0.2 | 33.3 | 21.9 | 0.0 | 0.0 |

Example 6

Figure 15:
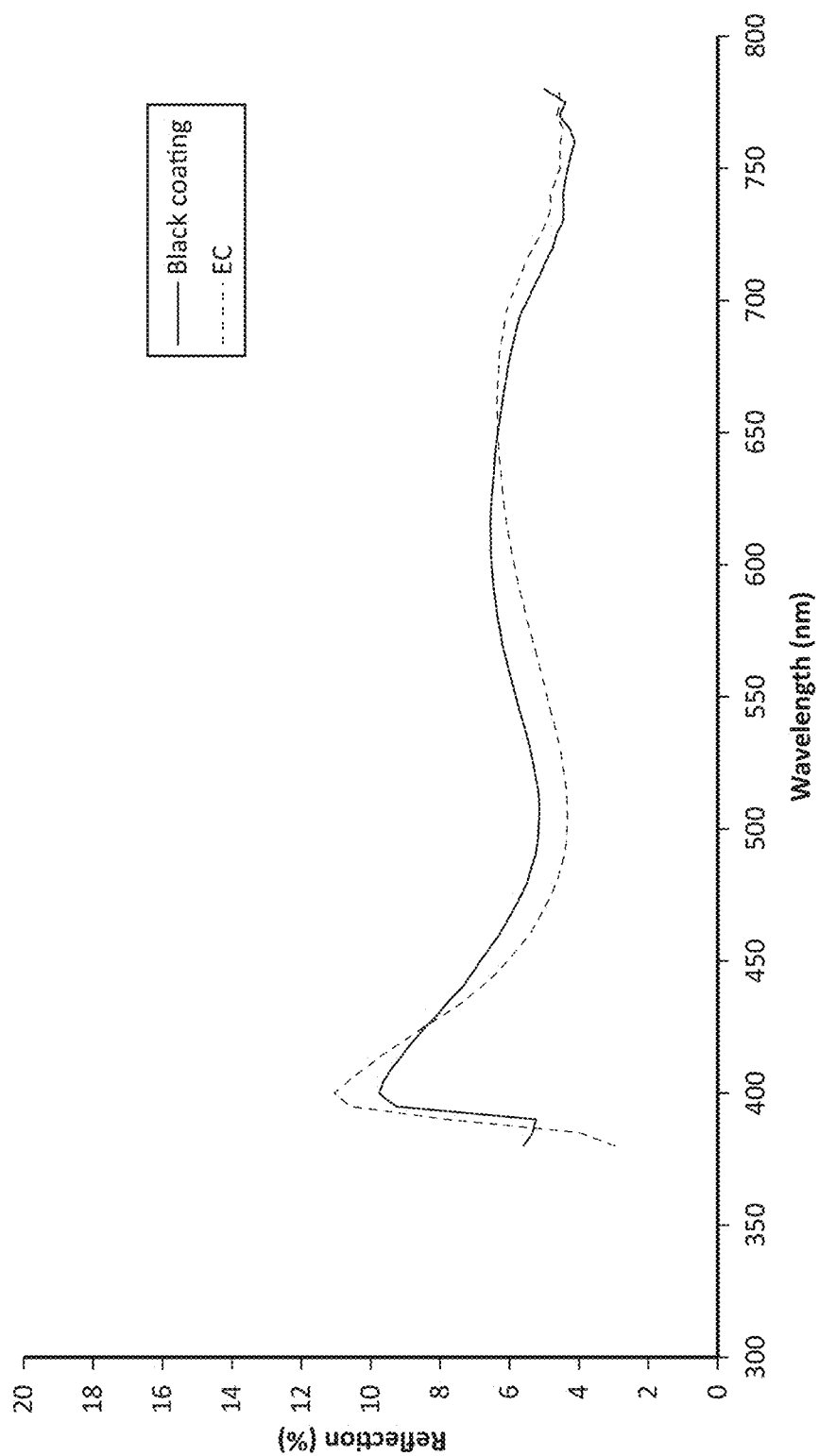
FIG. 15 is a plot depicting percent spectral reflectance with respect to wavelength according to some aspects of the present disclosure.

In the next example, a camera concealment coating is set forth using a combination of silicon and molybdenum. The combination of metals demonstrates that the desired optical properties can be tuned to provide black or nearly opaque coating. The layers, their thicknesses, and the corresponding reflectance and transmittance values are provided below in Tables 10 and 11. FIG. 15 provides a plot depicting percent spectral reflectance with respect to wavelength for the black conductive coating 58 provided.

TABLE 12

| Front Layer No. | Glass 5-Layer Design | |
|---|---|---|
| 1 | ITO | 134.06 nm |
| 2 | aSi | 4.29 nm |
| 3 | SiO2 | 51.00 nm |
| 4 | aSi | 24.21 nm |
| 5 | Mo | 84.85 nm |
| Back | EC fluid | |

TABLE 13

| | Visible Reflection at normal incidence | | |
| --- | --- | --- | --- |
| | Black coating | EC darkening | Sheet resistance |
| Y | 5.67 | 5.14 | 15 |
| a* | 2.55 | 7.77 | |
| b* | −0.33 | −5.18 | |

According to other aspects of the present disclosure, a switchable device is provided. The switchable device may include an electro-optic element switchable between a darkened state and a transmissive state. The electro-optic element may include a first substantially transparent substrate defining a first surface and a second surface, a second substantially transparent substrate defining a third surface and a fourth surface, a primary seal disposed between the first and second substrates, the seal and the first and second substrates defining a cavity therebetween, an electro-optic material positioned within the cavity, a transflective coating having a reflectance less than about 15% in a visible wavelength band positioned on the second surface and a black conductive coating positioned on one of the transflective coating and the second surface.

According to another aspect of the present disclosure, a sensor may be provided. The sensor may include a field of view at least partially defined by a perimeter portion of the electro-optic element. The darkened state may be configured to mask the sensor and visibly match the perimeter portion.

According to yet another aspect of the present disclosure, the sensor may be a camera, a proximity sensor, a speed sensor, a light sensor, a weather sensor, a particle sensor, an animal sensor, or a combination thereof.

According to another aspect of the present disclosure, the transflective coating may include a reflectance less than about 10%.

According to another aspect of the present disclosure, the black conductive coating may further include a first amorphous silicon layer, a silicon dioxide layer, a second amorphous silicon layer, and a molybdenum layer.

According to yet another aspect of the present disclosure, the first amorphous silicon layer may be positioned between the transflective coating and the silicon dioxide layer and the molybdenum layer may be positioned between the second amorphous silicon layer and the electro-optic material and the primary seal.

According to yet another aspect of the present disclosure, the silicon dioxide layer, the second amorphous silicon layer, and the molybdenum layer may be sputtered coatings.

According to another aspect of the present disclosure, the second substantially transparent substrate may be offset from the first substantially transparent substrate.

According to yet another aspect of the present disclosure, the second substrate may include less width than the first substrate.

According to another aspect of the present disclosure, the electro-optic element may include a thickness in the range of 0.5 mm to 1.6 mm.

According to another aspect of the present disclosure, the electro-optic material may be an electrochromic material.

According to another aspect of the present disclosure, the black conductive coating may cover at least a portion of the perimeter portion.

According to another aspect of the present disclosure, the black conductive coating may be directly positioned on the second surface.

According to another aspect of the present disclosure, the black conductive coating may be directly positioned on the transflective coating and in contact with the electro-optic material.

According to another aspect of the present disclosure, a sheet resistance of the black conductive coating may be 1 ohm/sq or less.

According to other aspects of the present disclosure, a switchable device is provided. The switchable device may include an electro-optic element switchable between a darkened state and a transmissive state. The electro-optic element may include a first substantially transparent substrate defining a first surface and a second surface, a second substantially transparent substrate defining a third surface and a fourth surface, a primary seal disposed between the first and second substrates, the seal and the first and second substrates defining a cavity therebetween, an electro-optic material positioned within the cavity, a first transflective coating having a reflectance less than about 15% in a visible wavelength band positioned on the second surface, a cover glass coupled to the first substantially transparent substrate defining a fifth surface and a sixth surface, the sixth surface adjacent the first surface of the first substantially transparent substrate, a second transflective coating positioned on the fifth surface and a black coating positioned on the second transflective coating.

According to another aspect of the present disclosure, a sensor may be provided. The sensor may include a field of view at least partially defined by a perimeter portion of the electro-optic element. The darkened state may be configured to mask the sensor and visibly match the perimeter portion.

According to yet another aspect of the present disclosure, the sensor may be a camera, a proximity sensor, a speed sensor, a light sensor, a weather sensor, a particle sensor, an animal sensor, or a combination thereof.

According to another aspect of the present disclosure, the first transflective coating and the second transflective coating may have a reflectance less than about 10%.

According to another aspect of the present disclosure, the black coating may further include a conductive coating including a first amorphous silicon layer, a silicon dioxide layer, a second amorphous silicon layer and a molybdenum layer.

According to yet another aspect of the present disclosure, the first amorphous silicon layer may be positioned between the transflective coating and the silicon dioxide layer and the molybdenum layer may be positioned between the second amorphous silicon layer and the electro-optic material and the primary seal.

According to yet another aspect of the present disclosure, the silicon dioxide layer, the second amorphous silicon layer, and the molybdenum layer may be sputtered coatings.

According to another aspect of the present disclosure, the first transflective coating and the second transflective coating may be optically similar.

According to yet another aspect of the present disclosure, the first transflective coating and the second transflective coating may be the same material.

According to another aspect of the present disclosure, the first transflective coating and the second transflective coating may be a transparent conductive oxide.

According to another aspect of the present disclosure, the electro-optic material may be an electrochromic material.

According to another aspect of the present disclosure, the second transflective coating and the black coating may define the field of view.

According to another aspect of the present disclosure, the black coating may include one of a paint or an ink.

According to another aspect of the present disclosure at least one of the first transflective coating and the second transflective coating may be sputtered coatings.

According to another aspect of the present disclosure, each of the first transflective coating and the second transflective coating may be sputtered coatings.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally includes the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A switchable device, comprising:
    an electro-optic element switchable between a darkened state and a transmissive state; and
    a sensor having a field of view at least partially defined by a perimeter portion of the electro-optic element,
    wherein the darkened state is configured to mask the sensor and visibly match the perimeter portion.

2. The switchable device of claim 1, wherein a shift of a color with angle should be less than about 10.0 C* units when a viewing angle is shifted up to about 60°.

3. The switchable device of claim 1, wherein a shift of a color with angle should be less than about 5.0 C* units when a viewing angle is shifted up to about 45°.

4. The switchable device of claim 1, wherein a shift of a color with angle should be less than about 2.5 C* units when a viewing angle is shifted up to about 30°.

5. The switchable device of claim 1, wherein the sensor is a camera, a proximity sensor, a speed sensor, a light sensor, a weather sensor, a particle sensor, an animal sensor, or a combination thereof.

6. The switchable device of claim 1, wherein the electro-optic element further comprises:
    a first substantially transparent substrate defining a first surface and a second surface;
    a second substantially transparent substrate defining a third surface and a fourth surface;
    a primary seal disposed between the first and second substrates, the seal and the first and second substrates defining a cavity therebetween;
    an electro-optic material positioned within the cavity; and
    a transflective coating having a reflectance less than about 15% in a visible wavelength band positioned on the second surface, comprising:
        a first layer comprising a first transparent conductive oxide;
        a second layer comprising a first absorbing metal;
        a third layer comprising a second transparent conductive oxide; and
        a fourth layer comprising a second absorbing metal,
        wherein the transflective coating is in contact with the electro-optic material.

7. The switchable device of claim 6, wherein the transflective coating has a reflectance less than about 10%.

8. The switchable device element of claim 6, wherein a sheet resistance of the transflective coating is less than or equal to about 10 ohms/sq.

9. The switchable device of claim 6, wherein the electro-optic material is an electrochromic material.

10. The switchable device of claim 1, wherein the electro-optic element further comprises:
    a first substantially transparent substrate defining a first surface and a second surface;
    a second substantially transparent substrate defining a third surface and a fourth surface;
    a primary seal disposed between the first and second substrates, the seal and the first and second substrates defining a cavity therebetween;

an electro-optic material positioned within the cavity;
a color suppressed transparent conducting oxide layer positioned on the second surface; and
an optical stack positioned on the color suppressed transparent conducting oxide layer.

11. The switchable device of claim 10, wherein the optical stack comprises:
a first layer comprising a transparent conductive oxide;
a second layer comprising a first absorbing metal;
a third layer comprising a quarter wave transparent conductive oxide; and
a fourth layer comprising a second absorbing metal, wherein the optical stack is in contact with the electro-optic material.

12. The switchable device of claim 11, wherein the optical stack is positioned directly on the second surface between the first substrate and the color suppressed transparent conducting oxide layer.

13. The switchable device of claim 11, wherein the color suppressed transparent conducting oxide layer is positioned directly on the second surface between the first substrate and the optical stack.

14. The switchable device of claim 10, wherein the optical stack comprises:
a chromium oxynitride ($CrO_xN_y$) layer.

15. The switchable device of claim 10, wherein the perimeter portion comprises a black conductive coating positioned between the optical stack and the seal.

16. A transparency, comprising:
a substrate defining a first surface and a second surface; and
a transflective coating having a reflectance less than about 15% in a visible wavelength band positioned on the second surface, comprising:
a first layer comprising a transparent conductive oxide;
a second layer comprising a first absorbing metal;
a third layer comprising a transparent conductive oxide; and
a fourth layer comprising a second absorbing metal, wherein the transflective coating is in contact with an electro-optic material.

17. The transparency of claim 16, wherein a color value is less than about 10 C* for at least one of transmittance, reflectance measured from the first surface and an exterior reflectance.

18. The transparency of claim 16, wherein the transflective coating has a reflectance less than about 10%.

19. The transparency of claim 16, wherein the transflective coating has a reflectance of about 6%.

20. The transparency of claim 16, wherein a sheet resistance of the transflective coating is less than or equal to about 10 ohms/sq.

* * * * *

UNITED STATES PATENT AND TRADEMARK OFFICE
CERTIFICATE OF CORRECTION

PATENT NO. : 11,269,232 B2
APPLICATION NO. : 16/596080
DATED : March 8, 2022
INVENTOR(S) : Adam R. Heintzelman et al.

It is certified that error appears in the above-identified patent and that said Letters Patent is hereby corrected as shown below:

In the Claims

Column 22, Claim 8, Line 54:
Delete "element"

Signed and Sealed this
Twenty-fourth Day of May, 2022

Katherine Kelly Vidal
*Director of the United States Patent and Trademark Office*